US011714853B2

(12) United States Patent
Remis et al.

(10) Patent No.: US 11,714,853 B2
(45) Date of Patent: *Aug. 1, 2023

(54) EFFICIENT STORAGE AND SEARCHING OF VECTOR DATASETS

(71) Applicant: Intel Corporation, Santa Clara, CA (US)

(72) Inventors: Luis Carlos Maria Remis, Hillsboro, OR (US); Vishakha Gupta, Seattle, WA (US); Christina R. Strong, Hillsboro, OR (US); Philip R. Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,554

(22) Filed: Jun. 29, 2021

(65) Prior Publication Data

US 2022/0164384 A1 May 26, 2022

Related U.S. Application Data

(63) Continuation of application No. 16/235,823, filed on Dec. 28, 2018, now Pat. No. 11,055,349.

(51) Int. Cl.
*G06F 16/901* (2019.01)
*G06F 16/903* (2019.01)
(Continued)

(52) U.S. Cl.
CPC ........ *G06F 16/901* (2019.01); *G06F 16/2237* (2019.01); *G06F 16/24558* (2019.01);
(Continued)

(58) Field of Classification Search
CPC ............ G06F 16/901; G06F 16/24558; G06F 16/2237; G06F 16/903; G06F 16/51; G06F 16/5854; G06F 16/5866; G06F 16/5838; G06F 16/5846; G06K 9/6217; G06K 9/46; G06K 9/00671; G06K 9/00268;
(Continued)

(56) References Cited

U.S. PATENT DOCUMENTS 9,077,949 B2 *  7/2015  Haseyama ......... H04N 21/4394
2011/0286628 A1 * 11/2011  Goncalves .......... G06F 16/5838
                                                    382/218

(Continued)

*Primary Examiner* — Evan Aspinwall
(74) *Attorney, Agent, or Firm* — Alliance IP, LLC

(57) ABSTRACT

In one embodiment, an apparatus comprises a storage device and a processor. The storage device stores a feature vector index, wherein the feature vector index comprises a sparse-array data structure representing a feature space for a set of labeled feature vectors, wherein the set of labeled feature vectors are assigned to a plurality of classes. The processor is to: receive a query corresponding to a target feature vector; access, via the storage device, a first portion of the feature vector index, wherein the first portion of the feature vector index comprises a subset of labeled feature vectors that correspond to a same portion of the feature space as the target feature vector; determine the corresponding class of the target feature vector based on the subset of labeled feature vectors; and provide a response to the query based on the corresponding class.

25 Claims, 15 Drawing Sheets

(51) Int. Cl.
    *G06F 16/22*       (2019.01)
    *G06F 16/2455*     (2019.01)
    *G06F 18/21*       (2023.01)
    *G06F 18/22*       (2023.01)
    *G06V 10/96*       (2022.01)
    *G06V 40/16*       (2022.01)

(52) U.S. Cl.
    CPC ............ *G06F 16/903* (2019.01); *G06F 18/21* (2023.01); *G06F 18/22* (2023.01); *G06V 10/96* (2022.01); *G06V 40/172* (2022.01)

(58) Field of Classification Search
    CPC ............. G06K 9/6228; G06K 2209/01; G06K 9/6267; G06K 9/6274; G06K 9/00288; G06K 9/00684; G06K 9/00993; G06K 9/6272; G06K 9/6215; G06T 2207/10016; G06T 2207/30201; G06T 7/246
    USPC ........................................................ 707/696
    See application file for complete search history.

(56) References Cited

U.S. PATENT DOCUMENTS

| | | | |
|---|---|---|---|
| 2014/0324870 A1* | 10/2014 | Kami | G06F 16/24575 707/758 |
| 2015/0049942 A1 | 2/2015 | Hamsici | |
| 2019/0295151 A1 | 9/2019 | Ghadar et al. | |

* cited by examiner

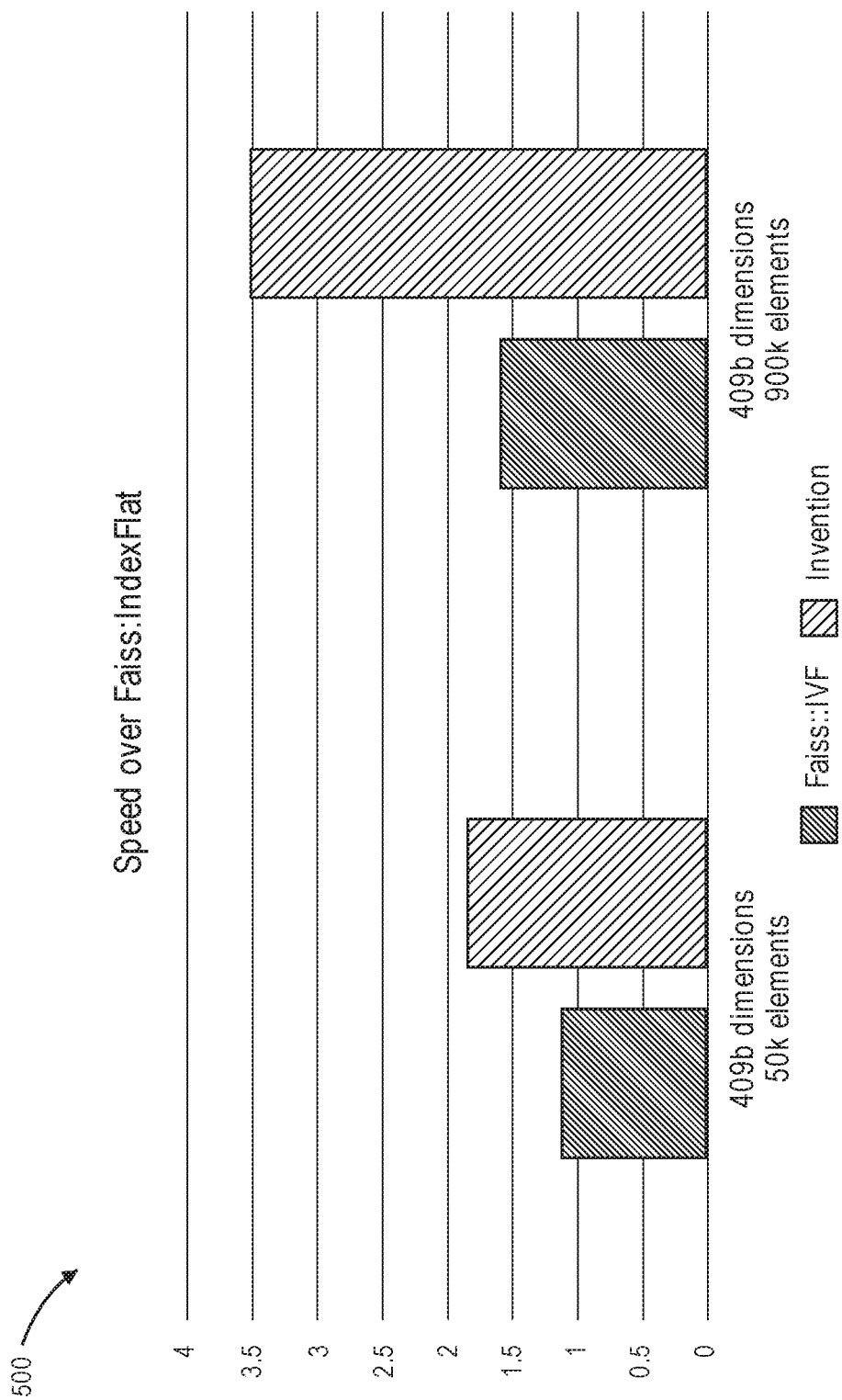

EFFICIENT STORAGE AND SEARCHING OF VECTOR DATASETS

CROSS-REFERENCE TO RELATED APPLICATIONS

This Application is a continuation (and claims the benefit of priority under 35 U.S.C. § 120) of U.S. application Ser. No. 16/235,823, filed Dec. 28, 2018, and entitled "EFFICIENT STORAGE AND PROCESSING OF HIGH-DIMENSIONAL FEATURE VECTORS." The disclosure of the prior Application is considered part of and is incorporated by reference in the disclosure of this Application.

FIELD OF THE SPECIFICATION

This disclosure relates in general to the field of visual computing, and more particularly, though not exclusively, to efficient storage and processing of high-dimensional feature vectors.

BACKGROUND

Many distributed and fog computing applications leverage high-dimensional feature vectors to represent a wide range of information, such as objects captured in images and/or videos. Managing high-dimensional feature vectors using traditional data storage solutions can be very inefficient, however, particularly due to the large size of typical feature vector datasets and the lack of native support for efficiently managing these feature vector datasets. For example, performing an operation over a feature vector dataset typically requires loading the entire set of feature vectors from persistent storage into memory, generating an index of the feature vectors, and then performing an operation using the index. This approach incurs significantly latency due to the persistent storage access and index generation required for each feature vector operation, and significant memory overhead is often required to store the resulting index in memory. Accordingly, traditional solutions are unable to efficiently store and process high-dimensional feature vectors in a transactional manner.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 5-6 illustrate performance graphs for various feature vector management solutions.

EMBODIMENTS OF THE DISCLOSURE

Figure 1:
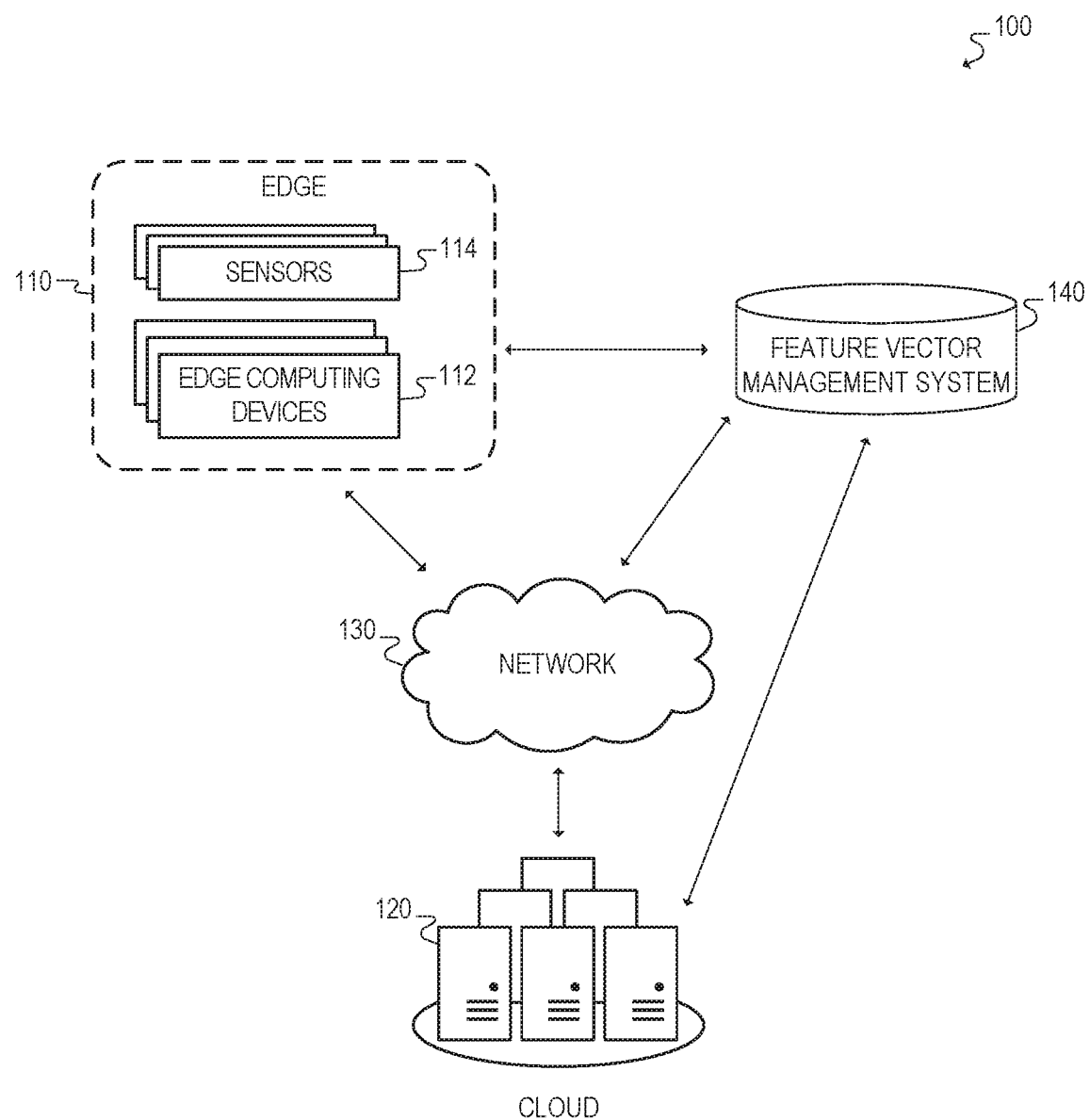
FIG. 1 illustrates an example fog computing environment with a feature vector management system in accordance with the embodiments described throughout this disclosure.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Efficient Storage and Processing of High-Dimensional Feature Vectors

Many distributed and fog computing applications rely on high-dimensional representations of information, which are commonly referred to as feature vectors, visual descriptors, or simply descriptors. For example, an n-dimensional feature vector may refer to a vector containing n numerical values that each represent a distinct feature associated with some collection of data. Thus, the dimensionality of a feature vector may refer to the number of distinct values or features contained within the feature vector. A high-dimensional feature vector may refer to a feature vector with a relatively large number of dimensions, which may vary depending on the particular application or use case.

As an example, visual computing applications often leverage high-dimensional feature vectors to represent objects or actions captured in visual data, such as images and/or videos. For example, an n-dimensional feature vector used to represent a particular object may contain n numerical values representing n distinct features of the object.

These high-dimensional feature vectors are often extracted from images and videos, labeled (e.g., assigned or tagged as belonging to a particular class), and then organized into an index that facilitates subsequent operations, such as searching the labeled feature vectors to determine the class of an unlabeled feature vector extracted from a new image or video. These operations are a necessary and critical step in the pipeline of many visual computing applications, including retail analytics and services, digital security and surveillance, and autonomous vehicles, among many other examples. Moreover, in a distributed visual computing pipeline (referred to as a visual fog pipeline), the processing associated with these operations is often distributed across the edge, the cloud, and/or the "fog" (e.g., any portion of the processing pipeline from the edge to the cloud).

With respect to facial recognition, for example, feature vectors can be used to represent the faces of people that are captured in images and/or videos, such as people that appear in a particular photo album, people that are captured entering a particular store (e.g., by a surveillance camera), and so forth. These feature vectors are typically extracted from visual data (e.g., images and/or videos) using a particular feature extraction technique. In some embodiments, for example, each value within an n-dimensional feature vector may represent a distinct feature associated with the visual data for a particular person's face. For example, the feature vector may contain 100 or more dimensions representing 100 or more corresponding features extracted from the visual data for that person's face.

These feature vectors are then tagged or labeled to identify the person corresponding to each face (e.g., based on their name or any other suitable identifier). In this manner, the set of labeled feature vectors can be subsequently used to answer visual questions or queries, such as "who is present in this new photo" or "which customers or clients frequently visit a particular store." For example, a person captured in a new image or video can be identified by extracting a target feature vector of the person's face, and then searching for the labeled feature vectors that are the most similar to the target feature vector (e.g., an operation referred to as a "neighbor search"). The labels of the similar feature vectors can then be used to identify the person, determine the last time the person was present in a particular store, and so forth.

There are currently no solutions, however, to efficiently store and query these high-dimensional feature vectors in a transactional manner (e.g., using a persistent backend storage that supports native feature vector matching or searching operations and provides consistency guarantees). In particular, traditional data storage solutions lack native support for high-dimensional feature vectors, and thus are not designed to store, query, and operate on high-dimensional feature vectors in an efficient manner. High-dimensional feature vectors (e.g., those used in visual applications) have unique properties that can be used to index and perform operations on them more efficiently. There are no current solutions (e.g., software libraries, database management systems, array managers, file systems), however, that leverage those properties to provide a transactional system that natively supports operations on high-dimensional feature vectors in an efficient manner.

For example, there are numerous existing database management systems, including relational databases (e.g., Microsoft SQL Server, MySQL, MemSQL, DB2 by IBM) and non-relational or "NoSQL" databases (e.g., Accumulo, Cassandra, Druid, HBase, Vertica, SAP HANA). However, none of these solutions recognize or include high-dimensional feature vectors as a principal data type, nor do they provide the requisite indexing and other functionality to perform operations over these feature vectors (e.g., neighbor searches). Accordingly, these database solutions are not designed to support high-dimensional feature vectors, as they fail to leverage the unique properties and statistical characteristics of feature vectors that allow them to be processed more efficiently.

As an example, using traditional data storage solutions, a feature vector query requires loading the entire set of labeled feature vectors from persistent storage into memory, generating an index for the labeled feature vectors, and then searching the index to identify similar or matching feature vectors. This approach can be very inefficient, however, due to the large size of typical feature vector datasets. For example, significantly latency is incurred for the persistent storage access and index generation that are required for each query. Moreover, storing the resulting index in memory often requires significant memory overhead.

Further, in order to use traditional data storage solutions for high-dimensional feature vectors, a user typically has to define a key-value schema for storing and retrieving sets of feature vectors, and then further develop or configure a separate and independent mechanism to index and operate on feature vectors after they have been retrieved. Existing approaches for building indices of multi-dimensional data over these storage backends suffer from various performance drawbacks, as they are typically only suitable for feature vectors with relatively few dimensions (e.g., four or less dimensions), such as feature vectors for geolocation data with three dimensions for latitude, longitude, and altitude. Beyond the performance drawbacks, these approaches also require a repetition of work and a waste of resources that can be avoided if the storage mechanism natively implements the requisite functionality for operating on high-dimensional feature vectors as a supported datatype.

For example, there are various "in-memory" libraries (e.g., Faiss, Fast Library for Approximate Nearest Neighbors (FLANN), and Eigen) that enable a user to load a set of feature vectors into an index in memory, and then perform operations using the index in memory (rather than using persistent storage directly). With these in-memory libraries, the scope of the index is limited to the runtime of the application, which requires the user to re-build the index every time the application runs, as the indexing process is a separate step disconnected from the mechanism used to persistently store the feature vectors. Further, these libraries are limited by the amount of memory in the system, and they also lack any native support for performing operations over the index of feature vectors.

Accordingly, this disclosure presents various embodiments of a feature vector management system for storing and processing high-dimensional feature vectors in an efficient manner. In some embodiments, for example, the feature vector management system leverages a novel feature vector index maintained in persistent storage to implement specialized operations over high-dimensional feature vectors. For example, the feature vector index may be implemented by representing the feature space for a set of high-dimensional feature vectors (also referred to as a "hyperspace") using a sparse-array data structure. The use of a sparse-array data structure to represent the hyperspace enables high-dimensional feature vectors to be indexed and searched more efficiently, directly from persistent storage, while also reducing the overall storage footprint on disk and/or in memory.

Figure 6:
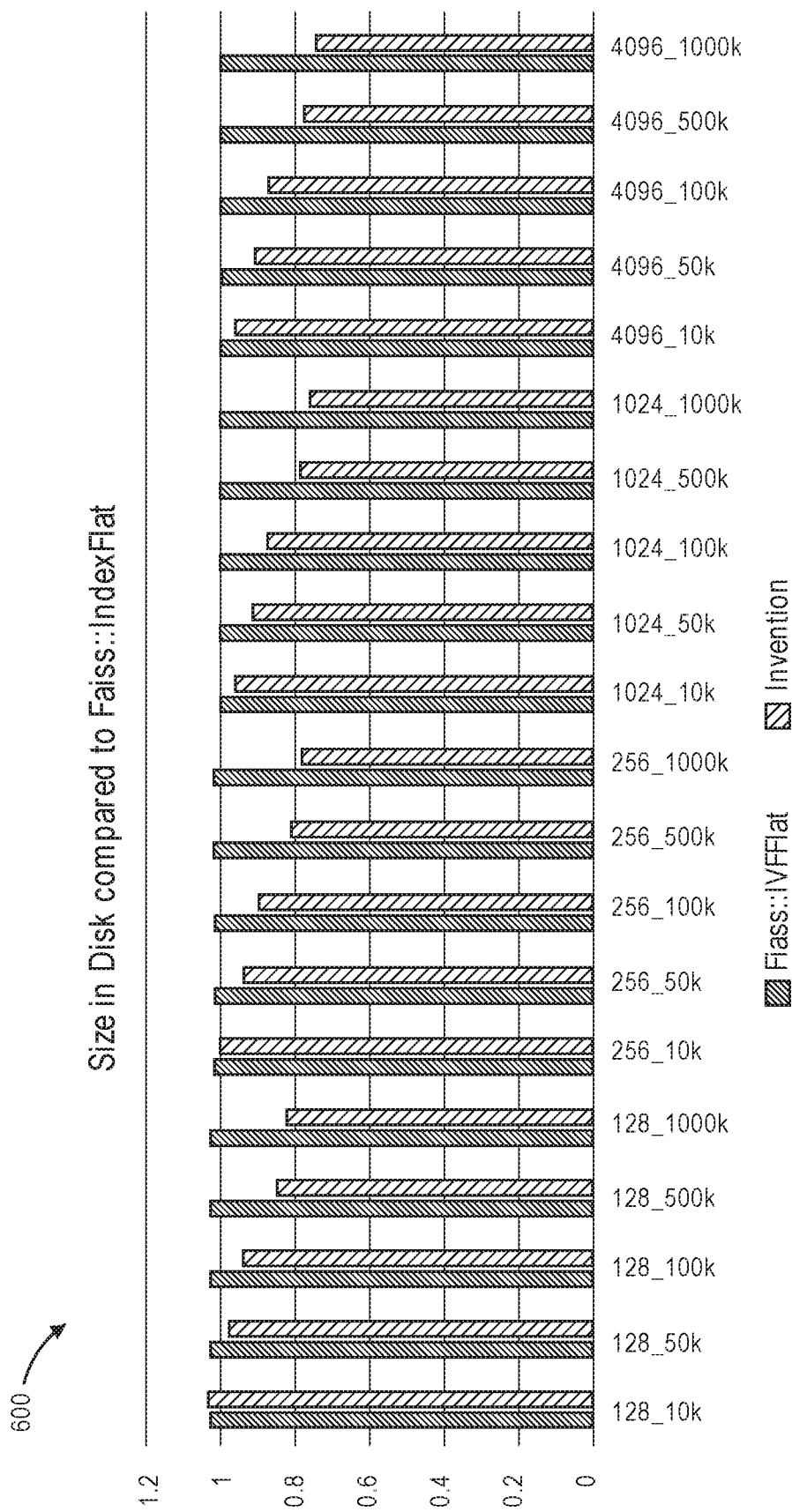

The described feature vector management system provides numerous advantages. For example, applications can efficiently store and operate over sets of high-dimensional feature vectors directly using persistent storage, which enables the excessive memory consumed by existing solutions (e.g., relational databases and/or indexing libraries) to be reclaimed. In this manner, application workflows can leverage reusable information within a feature vector index without being constrained by the memory available in the underlying system, while also saving storage space (e.g., as shown by FIG. 6) and providing consistency guarantees.

Further, the complete set of functionality that users previously had to implement and perform in separate stages (e.g., storing and updating a set of feature vectors, building an index, performing operations using the index) is now natively supported within a single building block, which incorporates various optimizations to improve performance. These performance optimizations cannot be achieved using existing relational databases, as relational databases lack the fundamental ability to generate indexes for high-dimensional feature vectors. Further, these performance optimizations enable common feature vector operations (e.g., a k-nearest neighbor search) to be performed much more efficiently than existing in-memory indexing libraries (e.g., as shown by FIG. 5). Moreover, in some embodiments, the distance computations for nearest neighbor searches may be further accelerated using a processor that supports vector-based instructions, such as single-instruction multiple-data (SIMD) processor instructions, or more specifically, Intel's Advanced Vector Extensions (AVX) SIMD instructions (e.g., AVX-512).

Accordingly, the described embodiments result in significant performance improvements for applications that leverage high-dimensional feature vectors, such as visual computing applications running on the cloud, edge, and/or in the fog.

FIG. 1 illustrates an example fog computing system 100 with a feature vector management system in accordance with the embodiments described throughout this disclosure. In the illustrated example, computing system 100 includes various edge resources 110 and cloud resources 120 communicating over a network 130, along with a feature vector management system 140, as described further below.

In the illustrated example, feature vector management system (FVMS) 140 is used to efficiently manage access to collections of feature vectors used by components of system 100. In various embodiments, for example, FVMS 140 may be implemented as a standalone component of system 100 that is used by other components of system 100 (e.g., analogous to a database server), or the functionality of FVMS 140 may be integrated or embedded within one or more existing components of system 100, such as edge computing devices 112 or cloud computing resources 120.

Moreover, in some embodiments, FVMS 140 may be implemented as a software library or application programming interface (API) used by computing applications that are executed on components of system 100. For example, in some embodiments, FVMS 140 may implement a software interface that can be used to search feature vector sets, as demonstrated by the following example:

contain a representation of the feature space for a particular set of feature vectors, which is stored within a sparse-array data structure. The sparse-array data structure significantly reduces the amount of storage required to represent the entire the feature space, as elements of the array that contain values of zero (e.g., which correspond to empty portions of the feature space that do not contain any feature vectors) are not stored. Moreover, this feature space representation within the index significantly improves the speed of similarity searches associated with feature vector queries, which reduces the query response latency. In particular, the index enables a subset of labeled feature vectors within the same neighborhood of similarity as a queried feature vector to be retrieved directly from persistent storage, without having to access or retrieve the remaining labeled feature vectors from persistent storage. Moreover, the similarity search is only performed over that smaller subset of labeled feature vectors rather than the entire set, which significantly improves the speed of the search.

For example, when a query associated with a new feature vector is received, the labeled feature vectors that are the most similar to the new feature vector are retrieved directly from the index in persistent storage using a sub-array access. In particular, the sub-array access is performed on the sparse-array data structure to retrieve only the labeled feature vectors that are in the same sub-region of the feature space as the new feature vector, as they will be the ones that are the most similar to the new feature vector since they reside in the same sub-region of the feature space. A similarity search can then be performed over this smaller subset of labeled feature vectors to identify those that are the most similar to the new feature vector (e.g., based on their computed distances to the new feature vector). In some cases, the class of the new feature vector may then be

```
"FindDescriptors": {
    "set": "party_faces", // Specify the descriptor set
    "k_closest": 2,       // Specify the number of nearest neighbors to return
    "radius": 243.434,    // Specify max search distance from the query descriptor
    "results": {          // for matching neighbors, return label, gender, and distance
                "list": ["_label",
                    "gender",
                    "_distance"],
                "return_descriptor": False // do not return descriptor values
    }
}
+ descriptor              // The query descriptor is passed using the client library
```

In some embodiments, for example, a visual computing application executing on one or more components of system 100 may use high-dimensional feature vectors to represent information contained in visual data, such as objects or actions contained in images or videos captured by cameras 114. For example, feature vectors may be extracted from a collection of visual data, labeled or assigned into the corresponding classes of information that they represent, and then stored as a set of labeled feature vectors. In this manner, the class of an unlabeled feature vector extracted from a new image or video can be derived by searching the set of labeled feature vectors for ones that are similar. In the illustrated embodiment, FVMS 140 can be used to manage access to the set of labeled feature vectors in order to improve performance.

For example, FVMS 140 leverages feature vector indexes to enable sets of feature vectors to be stored, retrieved, and/or searched directly from persistent storage. In some embodiments, for example, a feature vector index may derived based on the classes of the most similar labeled feature vectors in the subset. An appropriate response to the query can then be returned based on the results of the similarity search and/or the corresponding class derived for the new feature vector.

Moreover, in various embodiments, FVMS 140 may implement any or all aspects of the feature vector management functionality described further throughout this disclosure, either alone or in conjunction with other components of computing system 100.

Edge resources 110 may include any equipment, devices, and/or components deployed or connected near the "edge" of a communication network, such as edge computing devices 112 and sensors 114. Edge computing devices 112 may include any type of computing device deployed in the edge, such as on-premise servers, computing appliances, gateways, routers, personal computers, mobile devices (e.g., laptops, tablets, mobile phones, wearable devices), Internet-of-Things (IoT) devices, and so forth. Sensors 114 may include any type of device capable of capturing or detecting information associated with a particular environment, such as cameras and other vision sensors, microphones, motion sensors, and so forth. In some embodiments, for example, sensors 114 may include one or more cameras and/or other vision sensors to capture visual data containing representations of their surroundings.

Cloud resources 120 may include any resources or services that are hosted remotely over a network, which may otherwise be referred to as in the "cloud." In some embodiments, for example, cloud resources 120 may be remotely hosted on servers in a datacenter (e.g., application servers, database servers). In general, cloud resources 120 may include any resources, services, applications, and/or other functionality that can be utilized by or for components of computing system 100 (e.g., edge resources 110), including but not limited to, visual computing applications and services, IoT application and management services, data storage, computational services (e.g., data analytics, searching, diagnostics and fault management), security services (e.g., surveillance, alarms, user authentication), mapping and navigation, geolocation services, network or infrastructure management, payment processing, audio and video streaming, messaging, social networking, news, and weather, among other examples.

Communication network 130 may be used to facilitate communication among components of computing system 100, such as edge resources 110, cloud resources 120, feature vector management system 140, and/or any other remote resources or networks. In various embodiments, communication network 130 may be implemented using any type and/or number of communication network(s), including local area networks, wide area networks, public networks, the Internet, cellular networks, Wi-Fi networks, short-range networks (e.g., Bluetooth or ZigBee), and/or any other wired or wireless communication networks or mediums.

Any, all, or some of the computing devices of computing system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within computing system 100 of FIG. 1 may be utilized in each alternative implementation of the present disclosure. Additionally, one or more of the elements described in connection with the examples of FIG. 1 may be located external to computing system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of computing system 100 are described further in connection with the remaining FIGURES. Accordingly, it should be appreciated that computing system 100 of FIG. 1 may be implemented with any aspects of the embodiments described throughout this disclosure.

Figure 2:
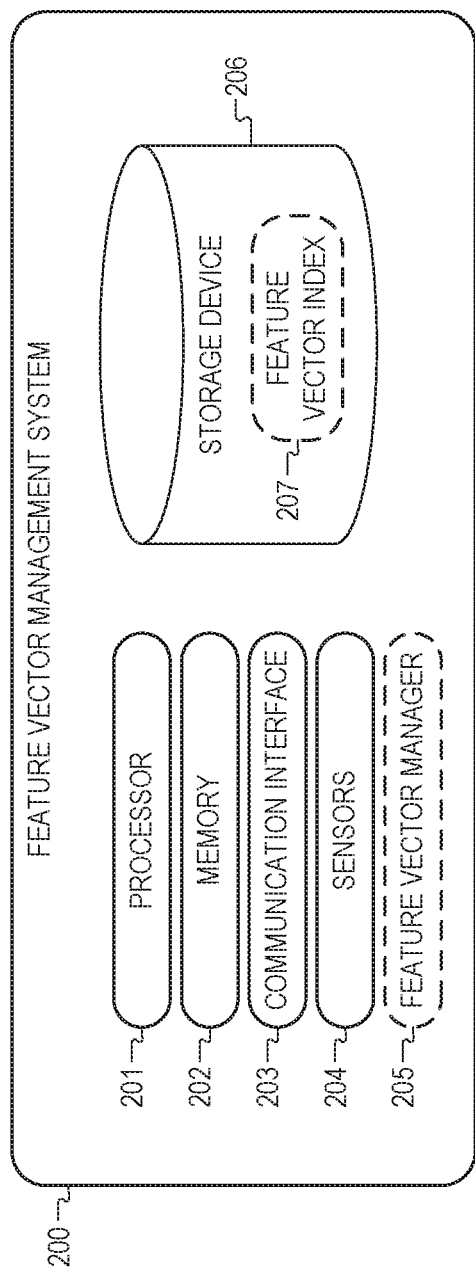
FIG. 2 illustrates an example embodiment of a feature vector management system.

FIG. 2 illustrates an example embodiment of a feature vector management system (FVMS) 200. In some embodiments, for example, the components of FVMS 200 may be used to implement the feature vector management functionality described throughout this disclosure.

In the illustrated embodiment, FVMS 200 includes one or more processors 201, one or more memory elements 202, one or more communication interfaces 203, one or more sensors 204, a feature vector manager 205, and one or more storage devices 206.

Processor 201 may be used to execute logic and/or instructions associated with the functionality of FVMS 200. Memory 202 may be used to store logic, instructions, and/or data used by components of FVMS 200. Communication interface 203 may be used to communicate with one or more remote components over a network. Sensors 204 may include any type of device capable of capturing or detecting information associated with a particular environment, such as cameras and other vision sensors, microphones, motion sensors, and so forth. In some embodiments, for example, sensors 204 may include one or more vision sensors that can be used to capture or generate visual representations of a surrounding environment, such as cameras, depth sensors, ultraviolet (UV) sensors, laser rangefinders (e.g., light detection and ranging (LIDAR)), infrared (IR) sensors, electro-optical/infrared (EO/IR) sensors, and so forth.

Feature vector manager 205 includes logic and/or instructions that can be executed by processor 201 to implement the feature vector management functionality described throughout this disclosure.

Storage device 206 may include any type of device for storing data. In some embodiments, for example, storage device 206 may include a persistent storage device capable of storing data persistently (e.g., hard disk drive (HDD), solid-state drive (SSD), distributed filesystem).

In the illustrated embodiment, storage device 206 is used to store feature vector index 207. Feature vector index 207 may contain a representation of a feature space for a particular set of feature vectors (e.g., stored within a sparse-array data structure), which may be used to manage access to the feature vectors in an efficient manner, as described further throughout this disclosure. For example, each feature vector may be a vector containing n numerical values that each represent a distinct feature associated with some collection of data. In some embodiments, for example, the set of feature vectors may include high-dimensional feature vectors that are used to represent information contained in visual data, such as objects or actions contained in images or videos captured by one or more vision sensors 204 (e.g., cameras). In other embodiments, however, the set of feature vectors may be used to represent information associated with any type of data, and the feature vectors may include any number of dimensions.

The respective components of FVMS 200 may be used to implement the feature vector management functionality described further throughout this disclosure. Moreover, in various embodiments, the underlying components and functionality of FVMS 200 may be combined, separated, and/or distributed across any number of devices or components.

Figure 3:
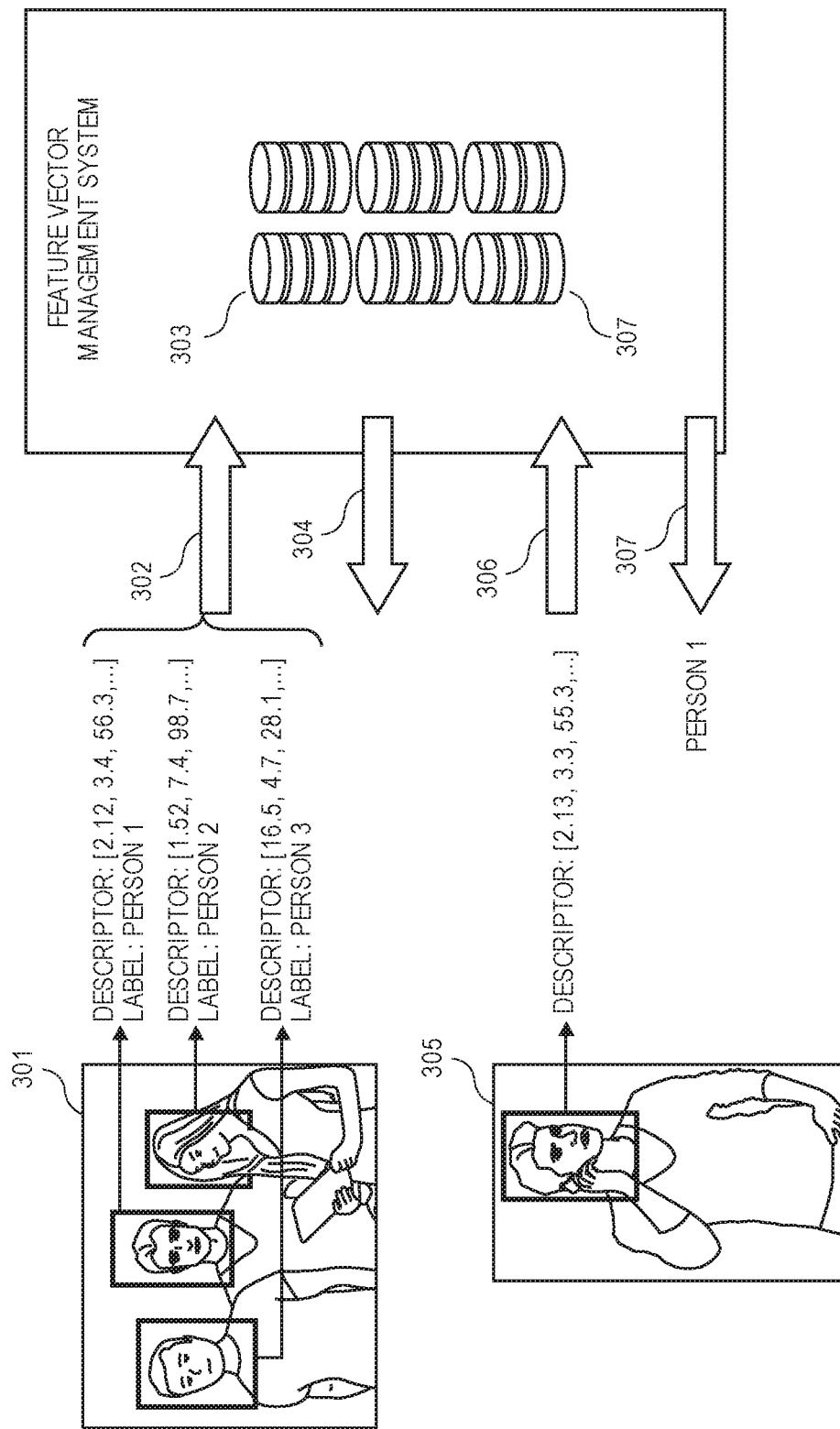
FIG. 3 illustrates an example of facial recognition using a feature vector management system.

FIG. 3 illustrates an example 300 of facial recognition using a feature vector management system in accordance with the embodiments described throughout this disclosure.

At step 301, a user application runs a facial feature extractor over a photo of people, which performs feature extraction to extract feature vectors corresponding to the faces of each person in the photo. These feature vectors are then tagged or labeled to identify the person corresponding to each face (e.g., based on their name or any other suitable identifier). In various embodiments, the labeling processing can be performed manually by a user or automatically by the feature vector management system (e.g., by performing classification on the feature vectors in the manner described further below).

At step 302, the set of labeled feature vectors are passed to the feature vector management system.

At step 303, the feature vector management system stores the set of labeled feature vectors by generating and/or updating an internal index of labeled feature vectors, which is maintained in persistent storage. In some embodiments, for example, the feature vector index may be implemented using a sparse-array data structure to represent the feature space corresponding to the set of labeled feature vectors.

At step 304, the feature vector management system returns successfully, indicating that the set of labeled feature vectors have been stored within the internal feature vector index.

At step 305, later in time, the user application obtains a new photo containing an unidentified person whom the application needs to identify. Accordingly, the user application runs the same facial feature extractor (e.g., from step 301) over the new photo to extract a target feature vector corresponding to the face of the person in the new photo.

At step 306, the user application submits a query via the "classify" interface of the feature vector management system to request that a corresponding label be determined for the target feature vector (e.g., by performing classification).

At step 307, the feature vector management system performs classification on the target feature vector to determine its corresponding label. In some embodiments, for example, the target feature vector is classified using a nearest neighbor search.

A nearest neighbor search can be used to search a pre-processed set of data objects to find those that are most similar to a queried or target data object (e.g., based on the Euclidian distance between the respective feature vectors). As an example, a nearest neighbor search could be performed over a set of labeled feature vectors representing objects extracted from visual data in order to find those that are most similar to an unlabeled feature vector extracted from recently-captured visual data. In this manner, the object represented in the unlabeled feature vector can be identified based on the label(s) of the most similar labeled feature vector(s).

In the illustrated embodiment, a nearest neighbor search for the target feature vector is performed using the feature vector index maintained in persistent storage, thus avoiding the need to re-load the entire set of labeled feature vectors from disk and then re-build the index for each query. Moreover, the feature vector index enables the nearest neighbor search to be performed more efficiently by only computing distances for a subset of the labeled feature vectors that are within the neighborhood of the target feature vector (e.g., as further described in connection with FIGS. 4A-C). In some embodiments, for example, the neighbor search is performed by: (1) retrieving a subset of labeled features from the index that are in the same portion of the feature space as the target feature vector; (2) computing the distances between each labeled feature vector in the subset and the target feature vector; (3) identifying the labeled feature vectors that are the most similar to the target feature vector based on the distance calculations; and (4) determining the corresponding label for the target feature vector based on the labels of the most similar labeled feature vectors.

At step 308, the feature vector management system returns the label corresponding to the target feature vector in response to the query from the user application.

In general, steps 301-304 are similar to typical steps of existing visual processing pipelines. Existing pipelines use a different indexing technique, however, which requires loading the labeled feature vectors from persistent storage into memory and then re-building the index each time a query is received. Thus, with respect to existing visual processing pipelines, steps 302-304 must be repeated each time a new query to classify a target feature vector is received (e.g., steps 305-308). By comparison, the proposed embodiments use a sparse-array indexing technique that only requires the index to be generated once, as that index can then be maintained in persistent storage and re-used for each query. Further, similarity or nearest neighbor searches can be performed much more efficiently using the sparse-array index than using existing indexing techniques.

Figure 4A:
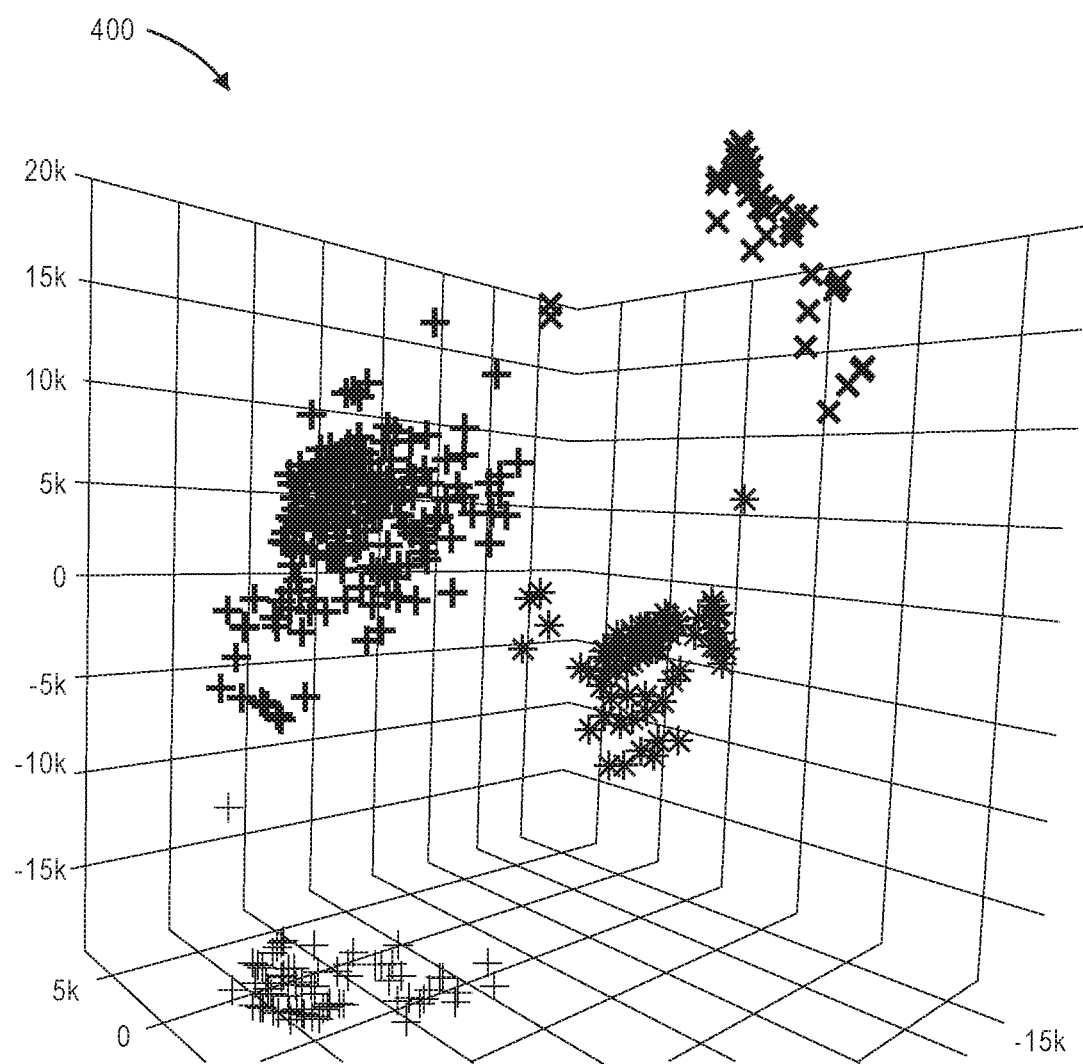
FIGS. 4A-C illustrate a visual representation of a feature vector index.
Figure 4B:
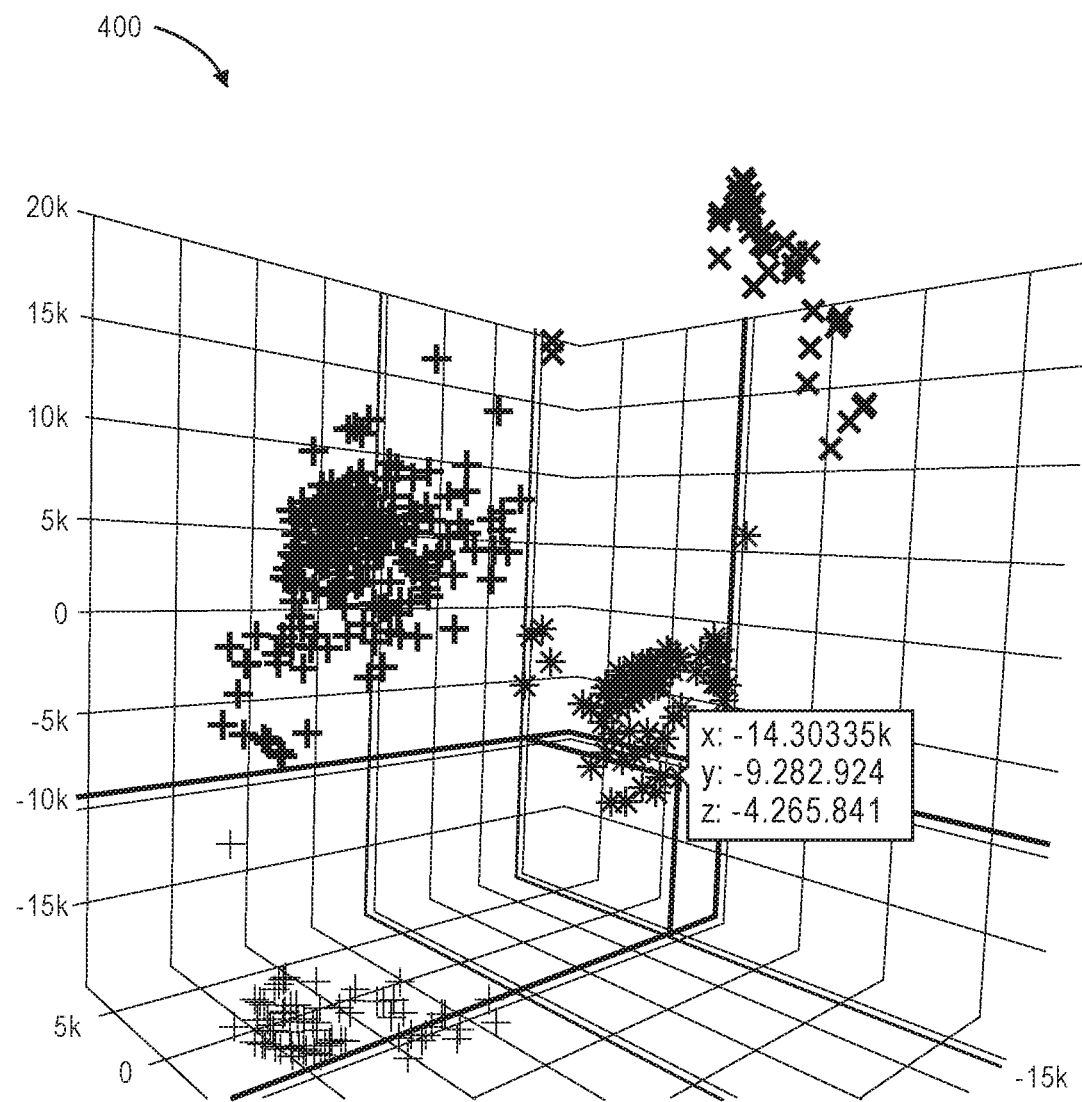
Figure 4C:
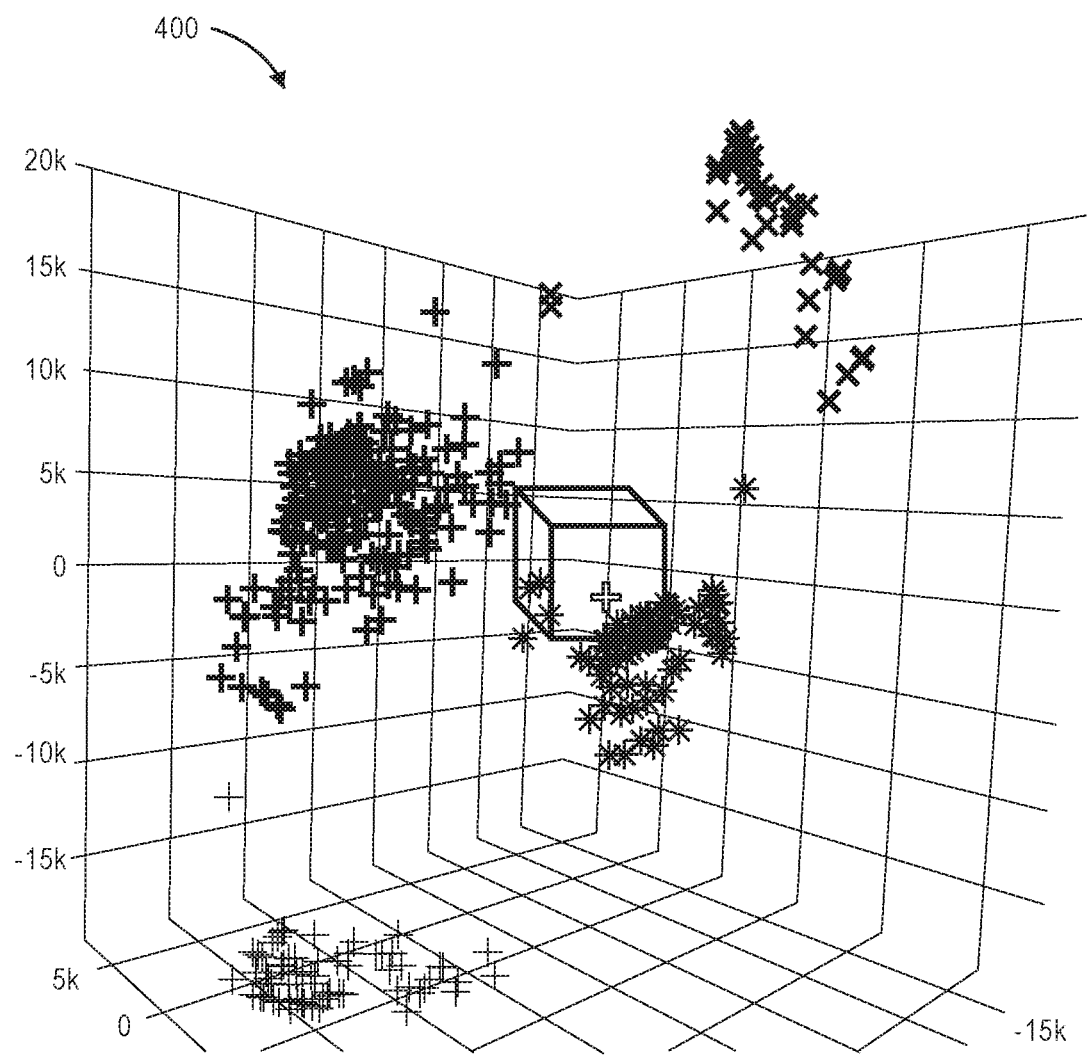

FIGS. 4A-C illustrate a visual representation of a feature vector index 400. In some embodiments, for example, the feature vector index 400 may contain a representation of a feature space for a set of high-dimensional feature vectors (e.g., stored within a sparse-array data structure), which may be used to manage access to the feature vectors in an efficient manner, as described further below and throughout this disclosure.

For example, an n-dimensional feature vector may refer to a vector containing n numerical values (e.g., scalar values) that each represent a distinct feature associated with some collection of data. Thus, the dimensionality of a feature vector may refer to the number of distinct values or features contained within the feature vector. Moreover, a high-dimensional feature vector may refer to a feature vector with a relatively large number of dimensions, which may vary for different applications and use cases. In some cases, for example, a high-dimensional feature vector may have as few as 10 dimensions or as many as 100 or more dimensions. For example, a feature vector used to represent an object captured in visual data often has 100 or more dimensions, which are used to represent a large collection of features associated with the object. It should be appreciated, however, that the described embodiments can be used with feature vectors of any dimensionality (e.g., regardless of whether the feature vectors are considered high-dimensional).

The feature space for a set of feature vectors may refer to the multi-dimensional vector space containing those feature vectors. For example, the scalar or numerical values within an n-dimensional feature vector can be treated as the coordinates of a point within an n-dimensional space. Accordingly, the n-dimensional space containing a set of feature vectors may be referred to as the feature space for those feature vectors. In some cases, the feature space for a set of high-dimensional feature vectors may be referred to as a "hyperspace." This vector-based representation of objects detected in visual data facilitates efficient processing and analysis on the objects using the underlying values within their respective feature vectors (e.g., performing similarity comparisons between objects based on the Euclidian distance between their corresponding feature vectors).

The hyperspace for a set of n-dimensional feature vectors can be visualized and represented as an array with n dimensions that has been discretized. As an example, FIG. 4A illustrates a feature space with three dimensions for ease of illustration (e.g., since it is unrealistic to visually represent any number of dimensions greater than three), but the same concepts can be applied to an n-dimensional hyperspace. In FIG. 4A, the three-dimensional feature space contains various points that are depicted using different shapes. Each point represents a feature vector in the feature space, and the shape of each point represents its corresponding label or class.

As can be seen from FIG. 4A, arrays are a natural way to represent a set of feature vectors as points in a feature space or hyperspace. For example, the feature space can be partitioned into discrete blocks of a particular granularity, and each block of the feature space can be represented as a discrete element within a three-dimensional array. In this manner, each feature vector in the feature space can be placed into one discrete element of the three-dimensional array.

In some embodiments, the values stored in the array for a particular feature vector may include a unique identifier along with a label to identify its class. Moreover, the values or coordinates within the feature vector itself may either be explicitly stored within the array, or simply implicitly encoded based on the position within the array of the element used to store the feature vector.

For example, the values or "coordinates" within a particular feature vector can be used to identify the corresponding element of the array where that feature vector is stored. In particular, each value within the feature vector may be used to derive an index into a corresponding dimension of the array. For example, the value of the $n^{th}$ element of the feature vector may be used to derive the index into the $n^{th}$ dimension of the array. In some embodiments, for example, the index into the nth dimension of the array may be computed as $$index_n = \frac{FeatureVector[n]}{granularity}.$$

For example, for a three-dimensional feature space partitioned into blocks with a granularity of 1, a feature vector with values [5.4, 2.3, 4.8] would be stored in the three-dimensional array at array[5][2][4]. In this manner, the values within the feature vector itself may be implicitly encoded based on the position of the particular element within the array that is used to store the feature vector.

In some cases, multiple feature vectors may fall within the same discrete element of the array, such as when multiple feature vectors have similar values or "coordinates" that are close to each other. In that scenario, a list of points may be placed within the corresponding element of the array.

The array representation of the feature space also enables sub-regions of the feature space to be easily accessed by simply retrieving the corresponding sub-arrays for those sub-regions from the array. In this manner, a sub-region of the feature space can be accessed to determine which feature vectors are stored in the discrete elements of that sub-region. For example, as shown in FIG. 4B, the sub-region defined by the range of coordinates x=[−10, −20], y=[−5, −10], z=[−10, 2] can be accessed by simply retrieving the corresponding sub-array, which would return the feature vector flagged in FIG. 4B, along with others that are nearby.

As can be seen from FIG. 4A, however, the feature vectors are not evenly distributed throughout the feature space. This is because subsets of feature vectors belonging to the same class typically form clusters within a feature space due to their similarities (e.g., as can be seen by the clusters of the four classes of feature vectors in FIG. 4A). As a result, many elements of the array used to represent the feature space will be empty or otherwise contain values of zero (e.g., elements of the array that correspond to the "empty" portions of the feature space, which contain no points or feature vectors).

Accordingly, the array used to represent the feature space can be further optimized by treating it as a sparse array rather than a dense array. A sparse array is an array in which many elements are "empty" or have values of zero, while a dense array is an array in which most elements are "full" or have non-zero values. A sparse array can be stored and processed using special data structures and/or algorithms that are designed to improve performance by taking advantage of the sparse nature of the data in the array (e.g., to avoid wasting storage and processing resources on empty elements of the array). Thus, performance can be improved by representing and processing the feature space using a data structure that is optimized for sparse arrays, as the requisite storage footprint will be reduced while processing speeds will improve.

In various embodiments, the sparse-array representation of the feature space may be stored using any suitable data structure for storing sparse arrays. For example, with respect to a sparse array, substantial memory savings can be achieved by leveraging a data structure that only stores the non-zero elements of the array. Examples of data structures that can be used to store sparse arrays efficiently include tree-based data structures (e.g., k-dimensional trees, octrees), dictionary of keys (DOK), lists of lists (LIL), linked lists (LNK), coordinate lists (COO), compressed sparse row (CSR) format, compressed sparse column (CSC) format, and compressed row storage (CSR) format, among other examples.

Further, in some embodiments, the sparse-array representation of the feature space may simply be stored using an array database manager that supports efficient storage and processing of sparse arrays, such as TileDB or SciDB. These array database managers also provide various compression alternatives for the data, as well as different levels of consistency at the underlying disk representation level. Further, array database managers typically improve the speed of common operations—such as insert and search operations—by enabling fast sub-array accesses. Accordingly, in some embodiments, an array database manager may be used to store the representation of the feature space in a sparse-array data structure.

In this manner, the sparse-array representation of the feature space can be used as an index 400 that enables high-dimensional feature vectors to be indexed and searched more efficiently, while also reducing the overall storage footprint of the index and feature vectors on disk and/or in memory.

With respect to existing solutions, for example, a search for a target feature vector typically involves computing the Euclidean distance between the target feature vector being searched and all other feature vectors in the collection, and then returning the particular feature vectors whose distances to the target feature vector are the smallest. This approach can be very inefficient for large collections of feature vectors, however, since the distance calculations must be performed over the entire set.

These searches can be performed much more efficiently using the sparse-array representation of the feature space described above, as it serves as a sparse feature vector index 400 that enables high-dimensional feature vectors to be accessed and searched more efficiently.

For example, once the feature vectors in the feature space have been loaded into the sparse feature vector index 400, a search for a target feature vector can be performed by identifying a sub-region of the feature space that encompasses the target feature vector, performing a sub-array access on the index to retrieve a sub-array corresponding to the identified sub-region, and then computing distances between the target feature vector and the subset of feature vectors within the retrieved sub-array.

In this manner, the sub-array access only retrieves a subset of feature vectors that are within the same region of the feature space as the target feature vector, which means those feature vectors are the closest or most similar to the target feature vector. Further, the distance computations are only performed over this much smaller subset of feature vectors instead of the entire set, which significantly improves the search speed. Moreover, in some embodiments, the search speed can be improved further by accelerating the distance computations using a processor that supports vector-based instructions, such as single-instruction multiple-data (SIMD) processor instructions, or more specifically, Intel's Advanced Vector Extensions (AVX) SIMD instructions (e.g., AVX-512).

This search process is depicted in FIG. 4C, which shows the target feature vector plotted in the feature space, along with a search area drawn around the target feature vector. The search area represents the sub-region of the feature space that is retrieved using the sub-array access. In some embodiments, for example, the search area may be defined to cover a region of the feature space that extends a certain distance or radius from the target feature vector. If no feature vectors are found within the search area, the size of the search area can be successively increased until feature vector(s) are found within the search area.

In this manner, feature vector index 400 can be used to implement a software library or API that supports transactional, persistent queries associated with feature vectors, such as queries that involve the following functionality:

Precise and Approximated K-Search (nearest neighbor (s)), with k=1 . . . N: Given an input feature vector, the library will compute its similarity (e.g., Euclidian distance) to existing feature vectors stored in the system to determine which of the existing feature vectors are the most similar or "closest" to the input feature vector.

Classification: Given an input feature vector (e.g., an unlabeled descriptor), the library will classify that feature vector and assign a corresponding label based on the existing feature vectors and corresponding labels stored in the system.

FIGS. 5-6 illustrate performance graphs for various feature vector management solutions. In particular, the illustrated performance graphs compare the performance of the invention to various techniques in the Faiss library—the Faiss IndexFlat (baseline) technique and the Faiss IVFFlat technique. In the illustrated examples, the invention is implemented using TileDB to store the feature vector index as a sparse array data structure in persistent storage. TileDB is an array database manager designed to manage data that can be represented using either sparse or dense arrays, making it an optimal solution for providing persistent storage of a feature vector index within a sparse array data structure.

FIG. 5 illustrates a performance graph 500 of the speedup of a k-nearest neighbor (k-NN) search using the invention and the Faiss IVFFlat technique versus the Faiss IndexFlat technique as a baseline. In the illustrated example, the performance evaluation was performed using feature vectors with 4096 dimensions, which were extracted from an intermediate layer of a neural network that was processing images of the Yahoo Flickr Creative Commons 100 Million (YFCC100m) dataset. Further, the performance evaluation was performed on multiple feature vector sets with respective sizes of 50 k and 900 k elements. As shown by graph 500, the speed of a k-NN search is significantly improved using the invention versus the respective Faiss techniques.

FIG. 6 illustrates a performance graph 600 comparing the size of storage used by the invention and the Faiss IVFFlat technique versus the Faiss IndexFlat technique as a baseline. In the illustrated example, the performance evaluation was performed on multiple feature vector sets with varying numbers of dimensions and set sizes, ranging from 128-dimensional feature vectors with a set size of 10 k to 4096-dimensional feature vectors with a set size of 1000 k. As shown by graph 600, the invention uses less storage than the Faiss techniques, particularly for larger datasets. For example, with respect to feature vector sets with a size of 1 million (e.g., 1000 k), the invention uses 75% of the storage used by the Faiss techniques, which is equivalent to a 25% reduction in storage on disk.

Figure 7:
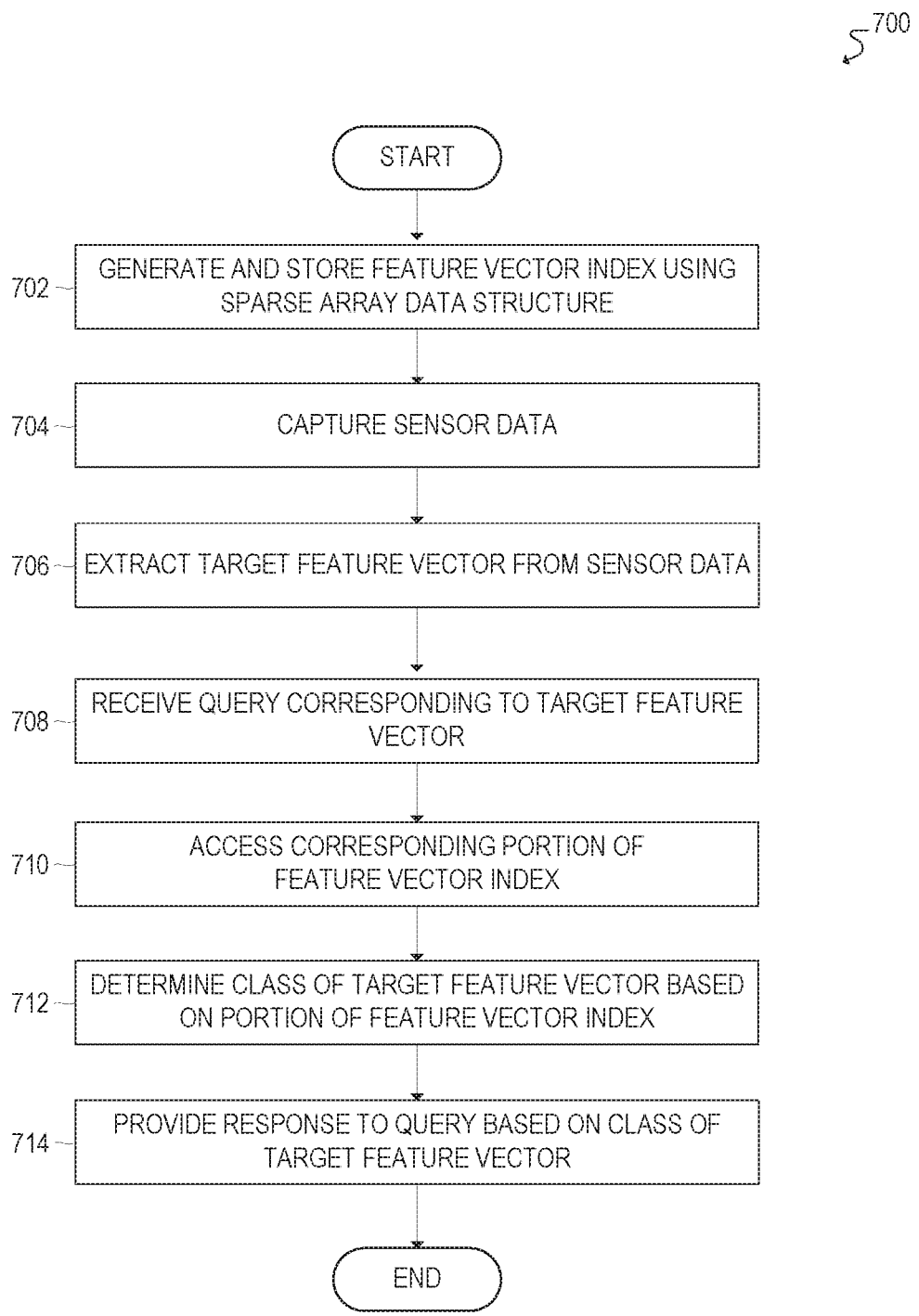
FIG. 7 illustrates a flowchart for an example embodiment of a feature vector management system.

FIG. 7 illustrates a flowchart 700 for an example embodiment of a feature vector management system. In some cases, for example, flowchart 700 may be implemented using the embodiments and functionality described throughout this disclosure.

The flowchart begins at block 702, where a feature vector index is generated and stored for a set of labeled feature vectors on a storage device (e.g., a persistent storage device).

In some embodiments, for example, the set of labeled feature vectors may be a set of n-dimensional vectors that are each used to represent a collection of n features associated with a particular dataset. Moreover, in some embodiments, the feature vectors may be high-dimensional feature vectors with at least ten dimensions (e.g., which correspond to ten distinct features represented within each feature vector).

Further, the set of labeled feature vectors may be labeled or assigned into corresponding classes or categories of the particular type of information they are used to represent. For example, in some embodiments, the set of labeled feature vectors may be used to represent a plurality of objects of a particular object type, and the classes of the feature vectors may be distinct classes of that particular object type.

Moreover, the feature vector index may contain a representation of the feature space for the set of labeled feature vectors, which may be stored within a sparse-array data structure in persistent storage. In this manner, the feature vector index can be used to store, retrieve, and/or search the feature vectors directly from persistent storage, as described further throughout this disclosure. In some embodiments, an array database manager (e.g., TileDB) may be used to store the feature vector index within a sparse-array data structure in persistent storage.

The flowchart then proceeds to block 704 to capture sensor data using one or more sensors. In some embodiments, for example, the sensor data may be visual data captured by one or more vision sensors or cameras.

The flowchart then proceeds to block 706 to extract a target feature vector from the sensor data. In some embodiments, for example, the target feature vector may be a representation of an object contained in visual data. Moreover, the target feature vector may be extracted using a particular feature extractor, which may be the same feature extractor that was used to extract the set of labeled feature vectors. For example, the feature extractor may be designed to extract certain types of features using a particular extraction technique.

In various embodiments, for example, the feature extractor may be implemented using any suitable feature extraction technique, including Fourier transforms, convolutions, scale-invariant feature transforms (SIFT), speeded-up robust features (SURF), histogram of oriented gradients (HOG), optical flow tracking, artificial neural networks (e.g., any type of convolutional neural network), and so forth.

The flowchart then proceeds to block 708 to receive a query corresponding to the target feature vector. In some cases, for example, the class of the target feature vector is initially unknown, as the target feature vector has not yet been labeled or assigned to a corresponding class. Accordingly, a computing application may submit a query to a feature vector management system in order to determine the class of the target feature vector.

The flowchart then proceeds to block 710 to access a first portion of the feature vector index on the storage device that corresponds to the target feature vector. For example, the first portion of the feature vector index comprises a subset of labeled feature vectors that are from the same portion of the feature space as the target feature vector.

In some embodiments, the first portion of the feature vector index on the storage device is accessed without accessing the remaining portion of the feature vector index on the storage device. For example, a sub-array of the sparse-array data structure—which contains the first portion of the feature vector index—is retrieved from the storage device. In some embodiments, for example, the sub-array may be retrieved by identifying the first portion of the feature space corresponding to the target feature vector (e.g., based on particular distance or radius from the target feature vector within the feature space), identifying the sub-array of the sparse-array data structure that corresponds to the first portion of the feature space, and then performing a sub-array access to retrieve that sub-array from the sparse-array data structure.

The flowchart then proceeds to block 712 to determine the corresponding class of the target feature vector based on the subset of labeled feature vectors contained in the first portion of the feature vector index.

In some embodiments, for example, the corresponding class of the target feature vector is determined by performing a distance calculation (e.g., a Euclidian distance calculation) between the target feature vector and each feature vector from the subset of labeled feature vectors, identifying one or more neighbor feature vectors corresponding to the target feature vector (e.g., which are identified from the subset of labeled feature vectors based on the distance calculation), and then determining the corresponding class of the target feature vector based on one or more classes of the one or more neighbor feature vectors.

In some embodiments, for example, the class of the target feature vector is determined by classifying the target feature vector based on a nearest neighbor classification model (e.g., which classifies the target feature vector into a corresponding class based on the one or more classes of the one or more neighbor feature vectors).

In various embodiments, however, the class of the target feature vector may be determined using any suitable classification technique, including nearest neighbors (e.g., k-nearest neighbors), clustering (e.g., k-means clustering), support vector machines (SVM), principal component analysis (PCA), non-negative matrix factorization (NMF), and/or any other suitable machine learning technique.

The flowchart then proceeds to block 714 to provide a response to the query based on the corresponding class determined for the target feature vector. In some cases, for example, the class derived for the target feature vector may be returned as the response to the query. Alternatively, the class derived for the target feature vector may be used to generate a response to a particular question contained in the query.

At this point, the flowchart may be complete. In some embodiments, however, the flowchart may restart and/or certain blocks may be repeated.

Example Internet-of-Things (IoT) Implementations

FIGS. 8-11 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
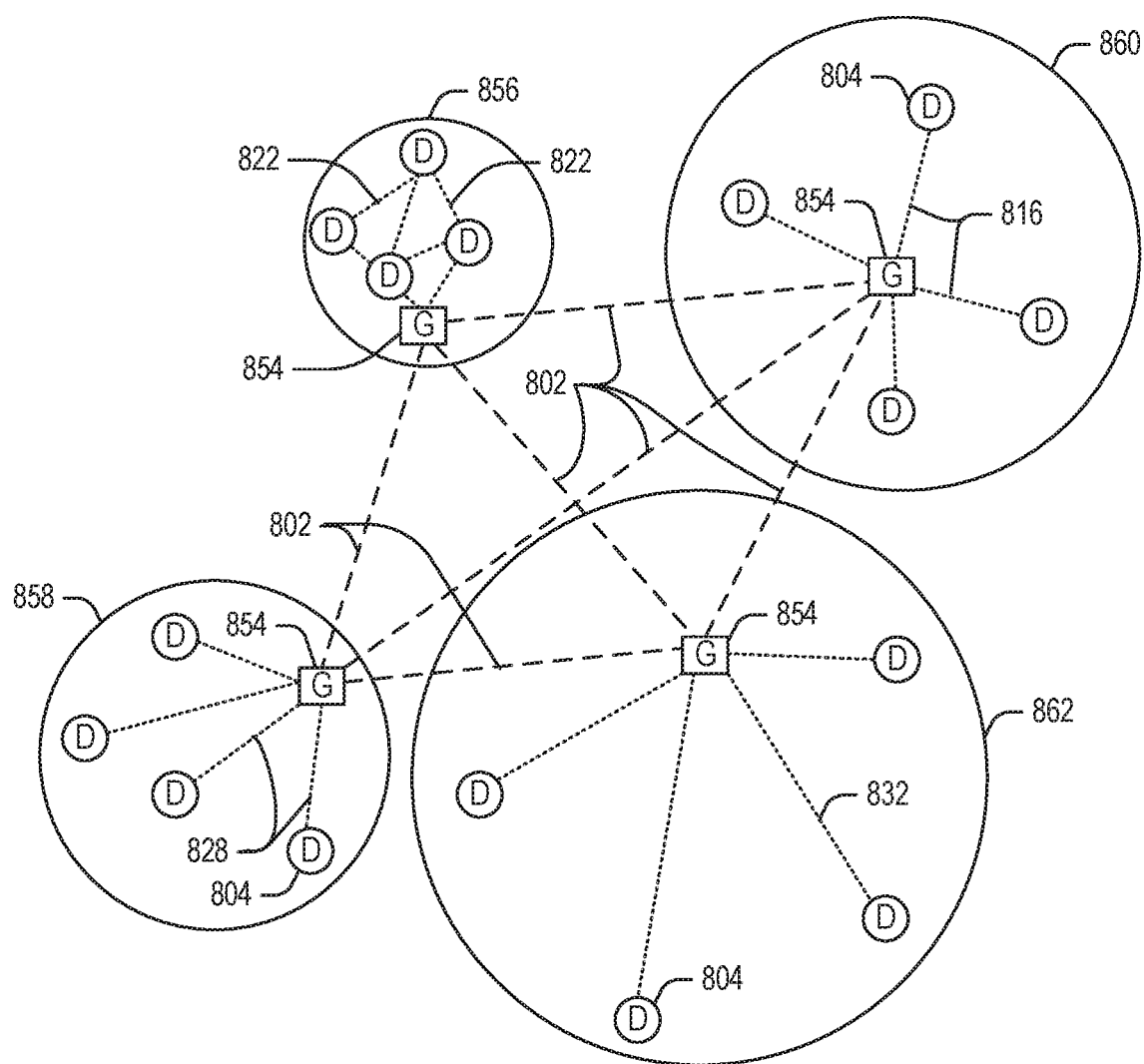
FIGS. 8, 9, 10, and 11 illustrate examples of Internet-of-Things (IoT) networks and architectures that can be used in accordance with certain embodiments.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8-11, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

Figure 9:
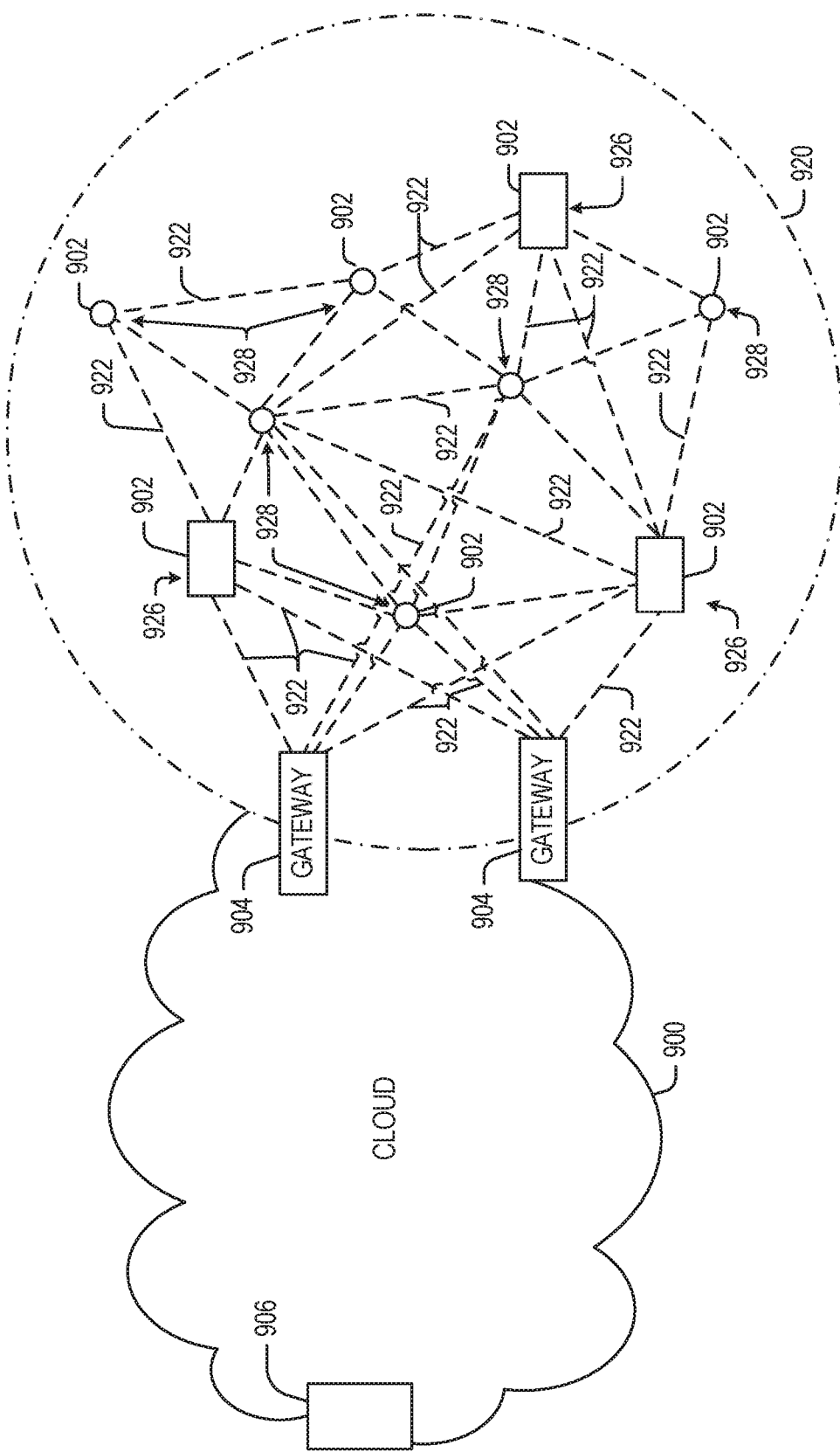

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back-end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

Figure 10:
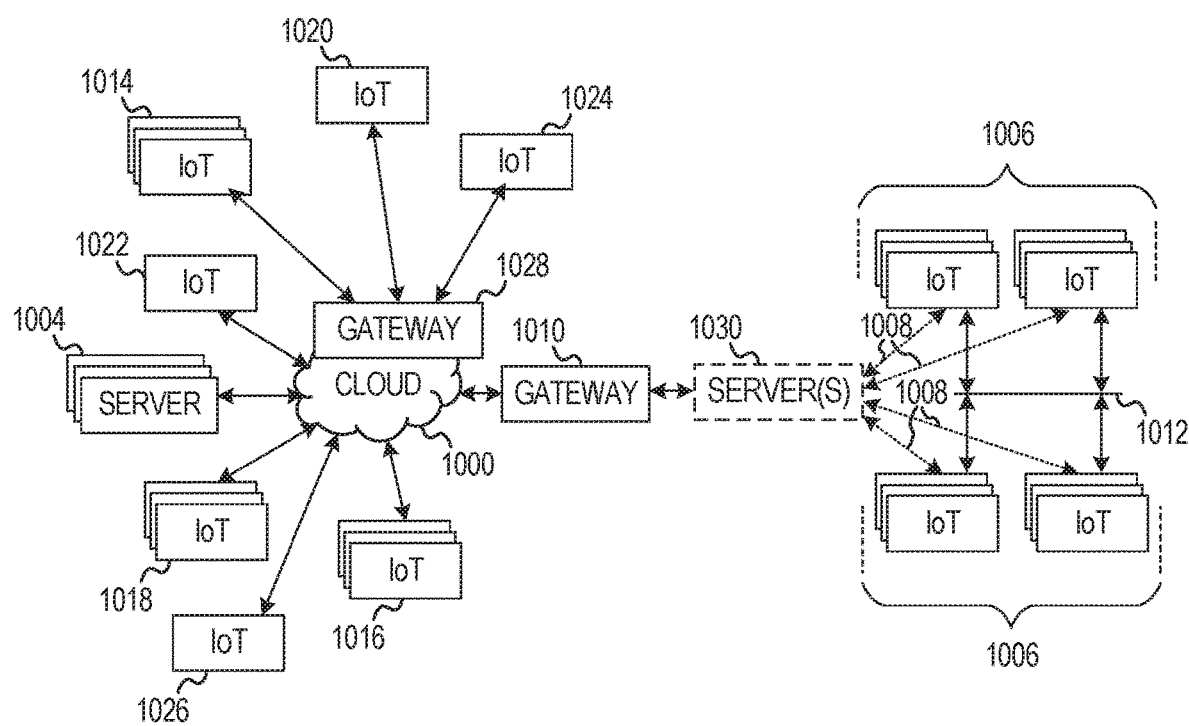

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
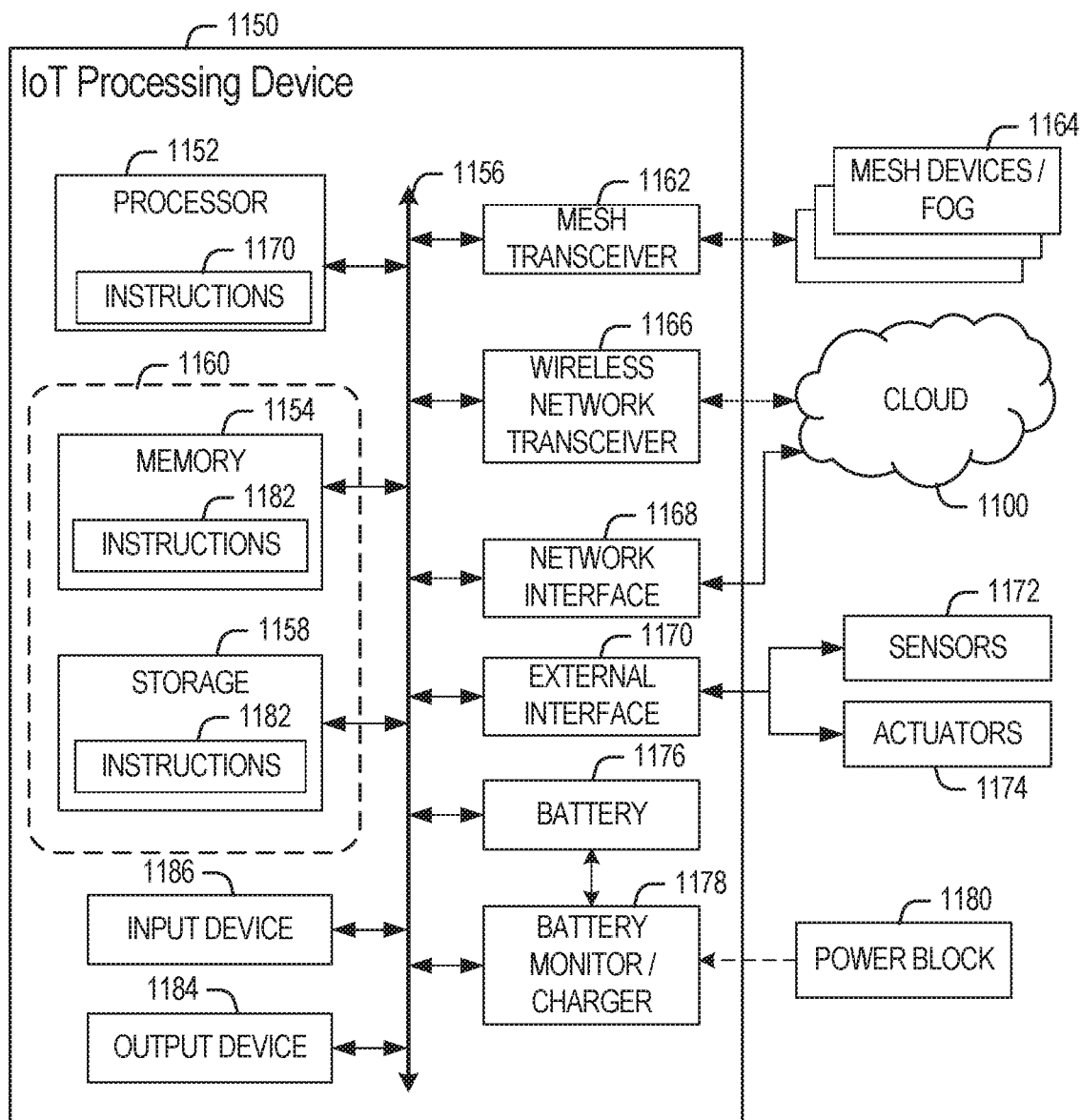

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may include storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and diagram(s) of operations and functionality described throughout this disclosure.

Example Computing Architectures

Figure 12:
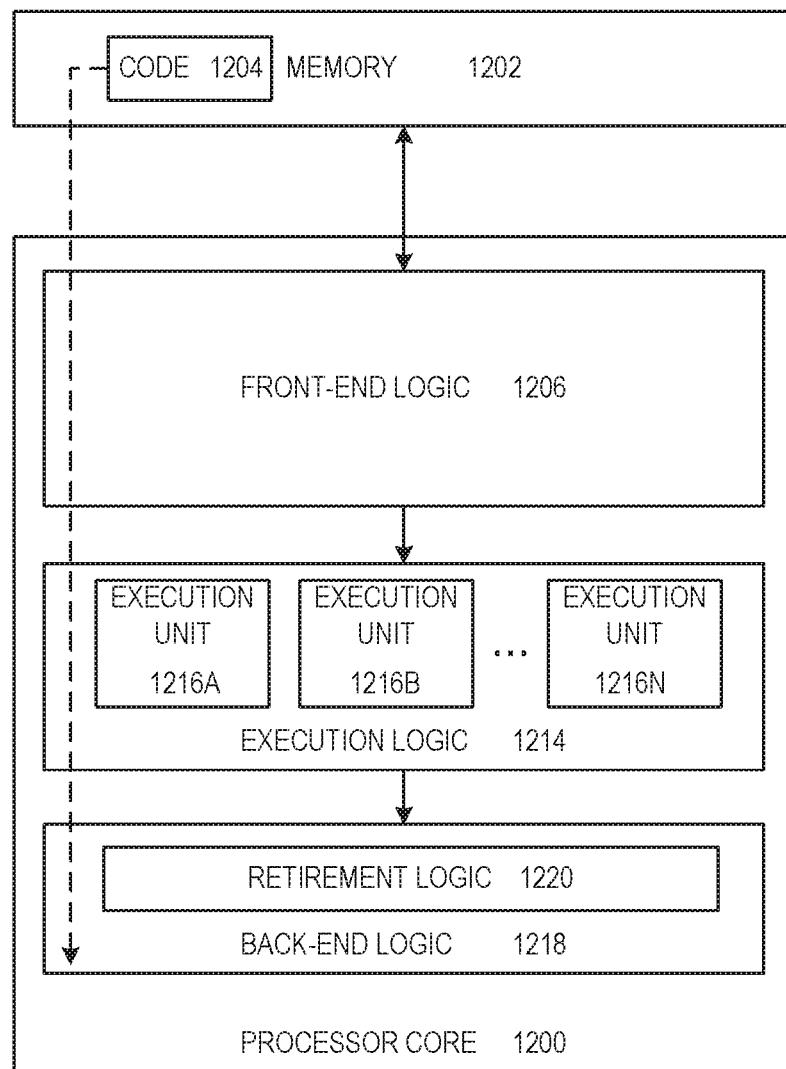
FIGS. 12 and 13 illustrate example computer architectures that can be used in accordance with certain embodiments.
Figure 13:
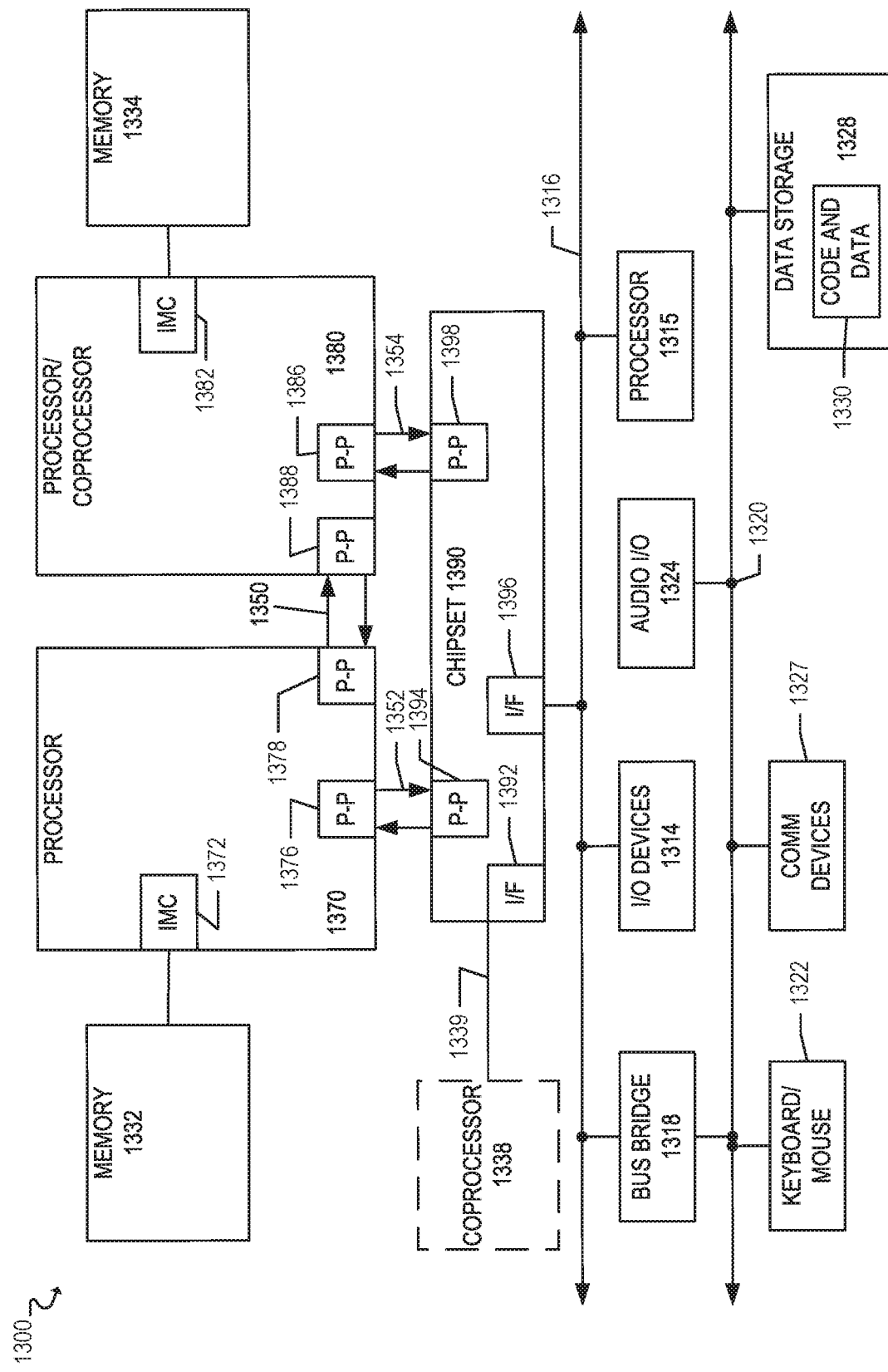

FIGS. 12 and 13 illustrate example computer processor architectures that can be used in accordance with embodiments disclosed herein. For example, in various embodiments, the computer architectures of FIGS. 12 and 13 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 12 illustrates a block diagram for an example embodiment of a processor 1200. Processor 1200 is an example of a type of hardware device that can be used in connection with the embodiments described throughout this disclosure. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 may also include register renaming logic and scheduling logic, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a block diagram for an example embodiment of a multiprocessor 1300. As shown in FIG. 13, multiprocessor system 1300 is a point-to-point interconnect system, and includes a first processor 1370 and a second processor 1380 coupled via a point-to-point interconnect 1350. In some embodiments, each of processors 1370 and 1380 may be some version of processor 1200 of FIG. 12.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of this disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

All or part of any component of FIG. 13 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's° industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLE IMPLEMENTATIONS

The following examples pertain to embodiments described throughout this disclosure.

One or more embodiments may include an apparatus, comprising: a storage device to store a feature vector index, wherein the feature vector index comprises a sparse-array data structure to represent a feature space corresponding to a set of labeled feature vectors, wherein the set of labeled feature vectors are assigned to a plurality of classes; and a processor to: receive a query corresponding to a target feature vector, wherein the target feature vector has not been assigned to a corresponding class from the plurality of classes; access, via the storage device, a first portion of the feature vector index corresponding to the target feature vector, wherein the first portion of the feature vector index comprises a subset of labeled feature vectors from the set of labeled feature vectors, wherein the subset of labeled feature vectors correspond to a same portion of the feature space as the target feature vector; determine the corresponding class of the target feature vector, wherein the corresponding class of the target feature vector is determined based on the subset of labeled feature vectors; and provide a response to the query based on the corresponding class determined for the target feature vector.

In one example embodiment of an apparatus, the processor is further to: access sensor data captured by one or more sensors; and extract the target feature vector from the sensor data.

In one example embodiment of an apparatus: the one or more sensors comprise one or more cameras; the sensor data comprises visual data captured by the one or more cameras; and the target feature vector comprises a representation of an object contained in the visual data.

In one example embodiment of an apparatus: the set of labeled feature vectors represent a plurality of objects of a particular object type; and the plurality of classes correspond to a plurality of distinct classes of the particular object type.

In one example embodiment of an apparatus, the processor to access, via the storage device, the first portion of the feature vector index corresponding to the target feature vector is further to: access the first portion of the feature vector index on the storage device without accessing a remaining portion of the feature vector index on the storage device.

In one example embodiment of an apparatus, the processor to access the first portion of the feature vector index on the storage device without accessing the remaining portion of the feature vector index on the storage device is further to: retrieve, from the storage device, a sub-array of the sparse-array data structure, wherein the sub-array comprises the first portion of the feature vector index.

In one example embodiment of an apparatus, the processor to retrieve, from the storage device, the sub-array of the sparse-array data structure is further to: identify a first portion of the feature space corresponding to the target feature vector, wherein the first portion of the feature space is identified based on a particular distance from the target feature vector within the feature space; and identify the sub-array of the sparse-array data structure that corresponds to the first portion of the feature space.

In one example embodiment of an apparatus, the processor to determine the corresponding class of the target feature vector is further to: perform a distance calculation between the target feature vector and each feature vector from the subset of labeled feature vectors; identify one or more neighbor feature vectors corresponding to the target feature vector, wherein the one or more neighbor feature vectors are identified from the subset of labeled feature vectors based on the distance calculation; and determine the corresponding class of the target feature vector based on one or more classes of the one or more neighbor feature vectors.

In one example embodiment of an apparatus, the processor to determine the corresponding class of the target feature vector based on the one or more classes of the one or more neighbor feature vectors is further to: classify the target feature vector based on a nearest neighbor classification model, wherein the nearest neighbor classification model is to classify the target feature vector into the corresponding class based on the one or more classes of the one or more neighbor feature vectors.

In one example embodiment of an apparatus, the distance calculation comprises a Euclidian distance calculation.

In one example embodiment of an apparatus, the set of labeled feature vectors comprise a plurality of high-dimensional feature vectors having a plurality of dimensions, wherein the plurality of dimensions comprise at least ten dimensions, and wherein the plurality of dimensions correspond to a plurality of features represented within each of the plurality of high-dimensional feature vectors.

One or more embodiments may include a system, comprising: one or more sensors to capture sensor data associated with an environment; a storage device to store a feature vector index, wherein the feature vector index comprises a sparse-array data structure to represent a feature space corresponding to a set of labeled feature vectors, wherein the set of labeled feature vectors are assigned to a plurality of classes; and one or more processing devices to: access the sensor data captured by the one or more sensors; extract a target feature vector from the sensor data, wherein the target feature vector has not been assigned to a corresponding class from the plurality of classes; access, via the storage device, a first portion of the feature vector index corresponding to the target feature vector, wherein the first portion of the feature vector index comprises a subset of labeled feature vectors from the set of labeled feature vectors, wherein the subset of labeled feature vectors correspond to a same portion of the feature space as the target feature vector; and determine the corresponding class of the target feature vector, wherein the corresponding class of the target feature vector is determined based on the subset of labeled feature vectors.

In one example embodiment of a system: the one or more sensors comprise one or more cameras; the sensor data comprises visual data captured by the one or more cameras; and the target feature vector comprises a representation of an object contained in the visual data.

In one example embodiment of a system, the one or more processing devices to access, via the storage device, the first portion of the feature vector index corresponding to the target feature vector are further to: access the first portion of the feature vector index on the storage device without accessing a remaining portion of the feature vector index on the storage device.

In one example embodiment of a system, the one or more processing devices to access the first portion of the feature vector index on the storage device without accessing the remaining portion of the feature vector index on the storage device are further to: identify a first portion of the feature space corresponding to the target feature vector, wherein the first portion of the feature space is identified based on a particular distance from the target feature vector within the feature space; identify a sub-array of the sparse-array data structure that corresponds to the first portion of the feature space, wherein the sub-array comprises the first portion of the feature vector index; and retrieve, from the storage device, the sub-array of the sparse-array data structure.

In one example embodiment of a system, the one or more processing devices to determine the corresponding class of the target feature vector are further to: perform a distance calculation between the target feature vector and each feature vector from the subset of labeled feature vectors; identify one or more neighbor feature vectors corresponding to the target feature vector, wherein the one or more neighbor feature vectors are identified from the subset of labeled feature vectors based on the distance calculation; and determine the corresponding class of the target feature vector based on one or more classes of the one or more neighbor feature vectors.

One or more embodiments may include at least one machine accessible storage medium having instructions stored thereon, wherein the instructions, when executed on a machine, cause the machine to: store a feature vector index on a storage device, wherein the feature vector index comprises a sparse-array data structure to represent a feature space corresponding to a set of labeled feature vectors, wherein the set of labeled feature vectors are assigned to a plurality of classes; receive a query corresponding to a target feature vector, wherein the target feature vector has not been assigned to a corresponding class from the plurality of classes; access, via the storage device, a first portion of the feature vector index corresponding to the target feature vector, wherein the first portion of the feature vector index comprises a subset of labeled feature vectors from the set of labeled feature vectors, wherein the subset of labeled feature vectors correspond to a same portion of the feature space as the target feature vector; determine the corresponding class of the target feature vector, wherein the corresponding class of the target feature vector is determined based on the subset of labeled feature vectors; and provide a response to the query based on the corresponding class determined for the target feature vector.

In one example embodiment of a storage medium, the instructions further cause the machine to: access sensor data captured by one or more sensors; and extract the target feature vector from the sensor data.

In one example embodiment of a storage medium: the one or more sensors comprise one or more cameras; the sensor data comprises visual data captured by the one or more cameras; and the target feature vector comprises a representation of an object contained in the visual data.

In one example embodiment of a storage medium, the instructions that cause the machine to access, via the storage device, the first portion of the feature vector index corresponding to the target feature vector further cause the machine to: access the first portion of the feature vector index on the storage device without accessing a remaining portion of the feature vector index on the storage device.

In one example embodiment of a storage medium, the instructions that cause the machine to access the first portion of the feature vector index on the storage device without accessing the remaining portion of the feature vector index on the storage device further cause the machine to: identify a first portion of the feature space corresponding to the target feature vector, wherein the first portion of the feature space is identified based on a particular distance from the target feature vector within the feature space; identify a sub-array of the sparse-array data structure that corresponds to the first portion of the feature space, wherein the sub-array comprises the first portion of the feature vector index; and retrieve, from the storage device, the sub-array of the sparse-array data structure.

In one example embodiment of a storage medium, the instructions that cause the machine to determine the corresponding class of the target feature vector further cause the machine to: perform a distance calculation between the target feature vector and each feature vector from the subset of labeled feature vectors; identify one or more neighbor feature vectors corresponding to the target feature vector, wherein the one or more neighbor feature vectors are identified from the subset of labeled feature vectors based on the distance calculation; and determine the corresponding class of the target feature vector based on one or more classes of the one or more neighbor feature vectors.

One or more embodiments may include a method, comprising: storing a feature vector index on a storage device, wherein the feature vector index comprises a sparse-array data structure to represent a feature space corresponding to a set of labeled feature vectors, wherein the set of labeled feature vectors are assigned to a plurality of classes; receiving a query corresponding to a target feature vector, wherein the target feature vector has not been assigned to a corresponding class from the plurality of classes; accessing, via the storage device, a first portion of the feature vector index corresponding to the target feature vector, wherein the first portion of the feature vector index comprises a subset of labeled feature vectors from the set of labeled feature vectors, wherein the subset of labeled feature vectors correspond to a same portion of the feature space as the target feature vector; determining the corresponding class of the target feature vector, wherein the corresponding class of the target feature vector is determined based on the subset of labeled feature vectors; and providing a response to the query based on the corresponding class determined for the target feature vector.

In one example embodiment of a method, accessing, via the storage device, the first portion of the feature vector index corresponding to the target feature vector comprises: accessing the first portion of the feature vector index on the storage device without accessing a remaining portion of the feature vector index on the storage device.

In one example embodiment of a method, accessing the first portion of the feature vector index on the storage device without accessing the remaining portion of the feature vector index on the storage device comprises: identifying a first portion of the feature space corresponding to the target feature vector, wherein the first portion of the feature space is identified based on a particular distance from the target feature vector within the feature space; identifying a sub-array of the sparse-array data structure that corresponds to the first portion of the feature space, wherein the sub-array comprises the first portion of the feature vector index; and retrieving, from the storage device, the sub-array of the sparse-array data structure.

What is claimed is:
1. A device, comprising:
   storage circuitry to store:
      a set of feature vectors, wherein the set of feature vectors represent a set of features for a plurality of data objects, wherein each feature vector represents the set of features for one of the data objects; and a vector index associated with the set of feature vectors, wherein the vector index organizes the set of feature vectors into regions of a vector space; and processing circuitry to:

receive, via a vector management application programming interface (API), a similarity search query for a target feature vector;

identify, based on the vector index, a subset of feature vectors close to the target feature vector in the vector space, wherein the subset of feature vectors is from the set of feature vectors;

compare the target feature vector with each feature vector in the subset of feature vectors;

identify, based on the comparison, one or more similar feature vectors relative to the target feature vector, wherein the one or more similar feature vectors are from the subset of feature vectors; and return, via the vector management API, a response to the similarity search query based on the one or more similar feature vectors.

2. The device of claim 1, wherein the data objects comprise objects in images or videos.

3. The device of claim 1, wherein:

the set of feature vectors form clusters within the vector space, wherein the vector space is sparse; and the vector index comprises a data structure for representing sparse data.

4. The device of claim 3, wherein the data structure comprises:

a tree;
a dictionary of keys;
a list of lists;
a linked list;
a coordinate list; or a sparse array data structure.

5. The device of claim 1, wherein the storage circuitry comprises persistent storage circuitry, wherein the set of feature vectors and the vector index are stored persistently on the persistent storage circuitry.

6. The device of claim 1, wherein the processing circuitry to identify, based on the vector index, the subset of feature vectors close to the target feature vector in the vector space is further to:

retrieve, from the storage circuitry, a portion of the vector index for a region of the vector space in which the target feature vector resides, wherein the portion of the vector index comprises the subset of feature vectors.

7. The device of claim 1, wherein the processing circuitry to compare the target feature vector with each feature vector in the subset of feature vectors is further to:

compute a Euclidian distance between the target feature vector and each feature vector in the subset of feature vectors.

8. The device of claim 1, wherein:

the data objects are of a particular object type;
the set of feature vectors are labeled with classes of the particular object type; and
the processing circuitry is further to determine a class of the target feature vector based on the classes of the one or more similar feature vectors.

9. The device of claim 1, wherein the set of feature vectors comprises high-dimensional feature vectors having at least 100 dimensions, wherein the dimensions correspond to the set of features represented by the high-dimensional feature vectors.

10. At least one machine accessible storage medium having instructions stored thereon, wherein the instructions, when executed on processing circuitry, cause the processing circuitry to:

receive, via a vector management application programming interface (API), a similarity search query for a target feature vector, wherein based on the similarity search query, a set of feature vectors is to be searched for one or more similar feature vectors relative to the target feature vector;

identify, based on a vector index, a subset of feature vectors that are close to the target feature vector in a vector space, wherein the vector index organizes the set of feature vectors into regions of the vector space, and wherein the subset of feature vectors is identified from the set of feature vectors;

compare the target feature vector with each feature vector in the subset of feature vectors;

identify, based on the comparison, the one or more similar feature vectors relative to the target feature vector, wherein the one or more similar feature vectors are identified from the subset of feature vectors; and return, via the vector management API, a response to the similarity search query based on the one or more similar feature vectors.

11. The storage medium of claim 10, wherein the set of feature vectors represent a set of features for a plurality of data objects, wherein each feature vector represents the set of features for one of the data objects.

12. The storage medium of claim 11, wherein the set of feature vectors comprises high-dimensional feature vectors having at least 100 dimensions, wherein the dimensions correspond to the set of features represented by the high-dimensional feature vectors.

13. The storage medium of claim 11, wherein the data objects comprise objects in images or videos.

14. The storage medium of claim 10, wherein:

the set of feature vectors form clusters within the vector space, wherein the vector space is sparse; and the vector index comprises a data structure for representing sparse data.

15. The storage medium of claim 14, wherein the data structure comprises:

a tree;
a dictionary of keys;
a list of lists;
a linked list;
a coordinate list; or a sparse array data structure.

16. The storage medium of claim 10, wherein the similarity search query is an approximate nearest neighbor search query.

17. The storage medium of claim 10, wherein the instructions that cause the processing circuitry to identify, based on the vector index, the subset of feature vectors close to the target feature vector in the vector space further cause the processing circuitry to:

determine, based on the vector index, that the subset of feature vectors are within a same region of the vector space as the target feature vector.

18. The storage medium of claim 17, wherein the instructions that cause the processing circuitry to determine, based on the vector index, that the subset of feature vectors are within the same region of the vector space as the target feature vector further cause the processing circuitry to:

retrieve, from a persistent storage device, a portion of the vector index corresponding to the same region of the vector space as the target feature vector, wherein the portion of the vector index comprises the subset of feature vectors.

19. The storage medium of claim 10, wherein the instructions that cause the processing circuitry to compare the target feature vector with each feature vector in the subset of feature vectors further cause the processing circuitry to:
compute a distance between the target feature vector and each feature vector in the subset of feature vectors.

20. The storage medium of claim 19, wherein the distance comprises a Euclidian distance.

21. The storage medium of claim 10, wherein:
the data objects are of a particular object type;
the set of feature vectors are labeled with classes of the particular object type; and
the instructions further cause the processing circuitry to determine a class of the target feature vector based on the classes of the one or more similar feature vectors.

22. A method, comprising:
receiving, via a vector management application programming interface (API), a similarity search query for a target feature vector, wherein based on the similarity search query, a set of feature vectors is to be searched for one or more similar feature vectors relative to the target feature vector;
identifying, based on a vector index, a subset of feature vectors that are close to the target feature vector in a vector space, wherein the vector index organizes the set of feature vectors into regions of the vector space, and wherein the subset of feature vectors is identified from the set of feature vectors;
comparing the target feature vector with each feature vector in the subset of feature vectors;
identifying, based on the comparison, the one or more similar feature vectors relative to the target feature vector, wherein the one or more similar feature vectors are identified from the subset of feature vectors; and
returning, via the vector management API, a response to the similarity search query based on the one or more similar feature vectors.

23. The method of claim 22, wherein:
the set of feature vectors form clusters within the vector space, wherein the vector space is sparse; and
the vector index comprises a data structure for representing sparse data.

24. A system, comprising:
a camera to capture images;
a persistent storage device to store:
a set of feature vectors, wherein the set of feature vectors represent a set of features for objects detected in the images, wherein each feature vector represents the set of features for one of the objects; and
a vector index associated with the set of feature vectors, wherein the vector index organizes the set of feature vectors into regions of a vector space; and
processing circuitry to:
receive, via a vector management application programming interface (API), a similarity search query for a target feature vector;
identify, based on the vector index, a subset of feature vectors close to the target feature vector in the vector space, wherein the subset of feature vectors is from the set of feature vectors;
compare the target feature vector with each feature vector in the subset of feature vectors;
identify, based on the comparison, one or more similar feature vectors relative to the target feature vector, wherein the one or more similar feature vectors are from the subset of feature vectors; and
return, via the vector management API, a response to the similarity search query based on the one or more similar feature vectors.

25. The system claim 24, wherein the processing circuitry comprises:
a central processing unit;
a graphics processing unit; or
a field-programmable gate array.

* * * * *